US012688448B2

(12) United States Patent
Larsen et al.

(10) Patent No.: US 12,688,448 B2
(45) Date of Patent: Jul. 21, 2026

(54) MEASUREMENT BASED PHOTONIC QUANTUM COMPUTING SYSTEM

(71) Applicant: Danmarks Tekniske Universitet, Kongens Lyngby (DK)

(72) Inventors: Mikkel Vilsbøll Larsen, Kongens Lyngby (DK); Jonas Schou Neergaard-Nielsen, Kongens Lyngby (DK); Ulrik Lund Andersen, Kongens Lyngby (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 352 days.

(21) Appl. No.: 18/271,175

(22) PCT Filed: Jan. 7, 2022

(86) PCT No.: PCT/EP2022/050268
§ 371 (c)(1),
(2) Date: Jul. 6, 2023

(87) PCT Pub. No.: WO2022/148839
PCT Pub. Date: Jul. 14, 2022

(65) Prior Publication Data
US 2024/0070504 A1 Feb. 29, 2024

(30) Foreign Application Priority Data
Jan. 8, 2021 (EP) ..................................... 21150702

(51) Int. Cl.
G06N 10/20 (2022.01)

(52) U.S. Cl.
CPC .................................... G06N 10/20 (2022.01)

(58) Field of Classification Search
CPC ................................ G06N 10/20; G06N 10/40
See application file for complete search history.

(56) References Cited

U.S. PATENT DOCUMENTS

| 11,405,115 | B2 * | 8/2022 | Gimeno-Segovia ........................ H04B 10/614 |
| 11,558,069 | B1 * | 1/2023 | Sparrow ................. G06N 10/40 |
| 12,254,381 | B1 * | 3/2025 | Alexander ............. G06N 10/40 |

OTHER PUBLICATIONS

Larsen et al.: "Deterministic multi-mode gates on a scalable photonic quantum computing platform", arXiv:2010.14422v2 [quant-ph] Aug. 28, 2021, Version 2.

(Continued)

*Primary Examiner* — An H Do
(74) *Attorney, Agent, or Firm* — DINSMORE & SHOHL LLP

(57) ABSTRACT

A measurement based photonic quantum computing system includes an optical input generator having a paired input source and a first time delay unit and a delocalized measurement architecture having a second time delay unit, a third time delay unit, two optical detectors, a beam splitter, a first and second variable path-couplers. The optical input generator is configured for receiving/generating first optical entangled paired inputs, and second optical entangled paired inputs, inducing a first predefined relative time delay using the first time delay unit into each optical entangled paired inputs for making one mode of the first and one mode of the second optical entangled paired inputs into coexisting optical inputs, representing a logic level of the quantum computing system. The delocalized measurement architecture is configured for gate implementation of the quantum computing system.

23 Claims, 12 Drawing Sheets

(56) References Cited

OTHER PUBLICATIONS

Asavanant et al.: "Generation of time-domain-multiplexedtwo-dimensional cluster state", Quantum Computing, Science 366, 373-376 (2019), http://science.sciencemag.org/ Oct. 18, 2019.

Bourassa et al.: "Blueprint for a Scalable Photonic Fault-Tolerant Quantum Computer", Quantum 5, 392(2021).https://quantum-journal.org/?s=Blueprint%20for%20a%20Scalable%20Photonic%20Fault-Tolerant%20Quantum%20Computer&reason=title-click, Feb. 2, 2021.

Fukui et al.: "Temporal-mode continuous-variable 3-dimensional cluster state for topologically-protected measurement-based quantum computation", Department of Applied Physics, School of Engineering, The University of Tokyo, 7-3-1 Hongo, Bunkyo-ku, Tokyo 113-8656, Japan, Aug. 3, 2020.

Fukui et al.: "High-Threshold Fault-Tolerant Quantum Computation with Analog Quantum Error Correction", Department of Physics, Graduate School of Science, Kyoto University, Kitashirakawa-Oiwakecho, Sakyo-ku, Kyoto 606-8502, Japan, May 25, 2018.

Gottesman et al.: " Encoding a qubit in an oscillator", Physical review A, vol. 64, 012310, DOI: 10.1103/PhysRevA.64.012310, PACS Nos. 03.67.Lx, Jun. 11, 2001.

Larsen et al.: "Deterministic generation of a two-dimensional cluster state", Science 366, 369-372, http://science.sciencemag.org/ , DOI: 10.1126/science.aay4354, Oct. 18, 2019.

Larsen et al.: "Deterministic multi-mode gates on a scalable photonic quantum computing platform", rXiv:2010.14422v1 [quant-ph] Oct. 27, 2020, Version 1.

Menicucci et al.: "Universal Quantum Computation with Continuous-Variable Cluster States", phusycal review letters, PRL 97, 110501., DOI: 10.1103/PhysRevLett.97.110501, Sep. 13, 2006.

Menicucci, Nicolas C.: "Fault-Tolerant Measurement-Based Quantum Computingwith Continuous-Variable Cluster States", School of Physics, The University of Sydney, Sydney, NSW, 2006, Australia, PACS Nos. 03.67.Lx, 03.67. pp. 42.50.Ex, Apr. 4, 2014.

Menicucci, Nicolas C.: "Temporal-mode continuous-variable cluster states using linear optics", Physical Review A 83, 062314 (2011), DOI: 10.1103/PhysRevA.83.062314, Jun. 13, 2011.

Noh and Chamberland: "Fault-tolerant bosonic quantum error correction with the surface-Gottesman-Kitaev-Preskill code", Physical Review A 101, 012316, DOI: 10.1103/PhysRevA.101.012316, Jan. 13, 2020.

Takeda et al.: Perspective: Toward large-scale tolerant univeral photonic quantum computing, Department of Applied Physics, School of Engineering, The University of Tokyo, XP081169739, Apr. 16, 2019.

Walshe et al.: "Robust fault tolerance for continuous-variable cluster states with excess anti-squeezing", Centre for Quantum Computation and Communication Technology,School of Science, RMIT University, Melbourne, AU.

Wu et al. : "Quantum computing with multidimensional continuous-variable cluster states in a scalable photonic platform", Physical Review Research 2, 023138, DOI: 10.1103/PhysRevResearch.2.023138, May 8, 2020.

Yokoyama et al.: "Ultra-large-scale continuous-variable cluster states multiplexed in the time domain", Nature Photonics, vol. 7, Dec. 2013,| www.nature.com/naturephotonics, DOI:10.1038/NPHOTON.2013.287, Nov. 17, 2013.

* cited by examiner

MEASUREMENT BASED PHOTONIC QUANTUM COMPUTING SYSTEM

CROSS-REFERENCE TO RELATED APPLICATIONS

This application is the U.S. National Stage of PCT/EP2022/050268 filed on Jan. 7, 2022, which claims priority to European Patent Application 21150702.5 filed on Jan. 8, 2021, the entire content of both are incorporated herein by reference in their entirety.

FIELD OF THE INVENTION

Continuous variable (CV) measurement-based quantum computation (MBQC) allows potentially for scalable quantum computation due to the deterministic preparation of a multi-mode entangled cluster state (N. C. Menicucci et al., Phys. Rev. Lett. 97, 110501 (2006)). However, due to finite squeezing, noise accumulates in the computation. This is circumvented by encoding Gottesman-Kitaev-Preskill (GKP) qubits into the CV quadratures, and regularly correcting these (D. Gottesman, A. Kitaev, and J. Preskill, Phys. Rev. A 64, 012310 (2001)), which leads to translation of the CV noise from finite squeezing into qubit errors, which may then be corrected using qubit error correction.

In 2014 an upper bound of the squeezing required for fault-tolerant MBQC was estimated to be 20.5 dB using a 2D cluster state allowing encoding in one dimension and gates implemented by projective measurements in another dimension (N. C. Menicucci, Phys. Rev. Lett. 112, 120504 (2014)). Since then many squeezing thresholds have been estimated for CV MBQC: Using a 2D cluster state, in (B. W. Walshe, et al., Phys. Rev. A 100, 010301(R) (2019)) a 15-17 dB threshold was suggested, while to achieve better thresholds topological qubit error correction using a 3D cluster state has been proposed leading to a 10 dB threshold in (K. Fukui, et al., Phys. Rev. X 8, 021054 (2018)). However, these thresholds are not complete: In (N. C. Menicucci, Phys. Rev. Lett. 112, 120504 (2014)) and (B. W. Walshe, et al., Phys. Rev. A 100, 010301(R) (2019)) it is not considered how to implement the qubit error correction, while in (K. Fukui, et al., Phys. Rev. X 8, 021054 (2018)) a 3D cluster state of GKP qubits is assumed available excluding noise from the cluster state preparation.

Two schemes for 3D cluster state generation allowing topological error correction are proposed in (B. H. Wu, et al., Phys. Rev. Research 2, 023138 (2020)) and (K. Fukui, et al., Phys. Rev. A 102, 032614 (2020)), but here it is not shown how topological error correction performs on these schemes, while they are experimentally challenging to realize. Most recently in (J. E. Bourassa et al., (2020), arXiv:2010.02905 [quant-ph]), 3D cluster state generation and topological error correction have been put together leading to a 10.5 dB threshold. However, this scheme, and the resulting threshold, relies on a large number of noiseless on-line entangling and swap gates which are experimentally hard to realize, while the scheme is built with spatial encoding leading to scalability performance similar to other spatially encoded computation platforms.

BACKGROUND OF THE INVENTION

In the present application, the following terms can preferably be or is to be understood as Paired inputs means that the inputs consist of a first input in a first path and a second input in a second path, where the first and second inputs are simultaneously in the first and second paths, respectively. The first and second input may be separable for transferring information into the computation, or entangled for implementation of gates. Entangled paired input may be prepared in various ways, as for instance by two single-mode squeezed states, or two GKP states, interfered on a balanced path-coupler, or by non-degenerate parametric down-conversion or non-degenerate four-wave mixing. Separable paired input may for instance be prepared using an optical switch on an otherwise entangled paired input, substituting one part or mode of the paired input with an input of encoded information for computation.

Relative time delay means that two inputs/outputs, which were coexisting before the time delay, have been separated in time by delaying one mode of the two inputs/outputs.

Relative time delay unit causes the relative time delay. The relative time delay unit is preferably positioned in one of two paths, so that the one mode of the paired inputs is delayed in relation to the other mode of the paired inputs. The relative time delay unit can e.g. be an optical fiber, or a waveguide on an integrated photonic chip.

Coexisting optical inputs mean that the optical inputs to e.g. a path coupler are reaching the path coupler so that the optical inputs overlapping each other partly in time so they can interact. The path coupler has at least two input paths, where each coexisting optical input reaches the path coupler along its own input path coincidentally to at least partly overlap each other in time.

Intermediate outputs mean coexisting optical inputs that have earlier been undergoing an interaction in e.g. a path coupler, wherein the interaction has e.g. been with the coexisting optical inputs themselves.

A path-coupler, is a unit with two or more input paths, where two or more optical inputs can interact with each other when the optical inputs reach the path coupler coincidentally to at least partly overlap each other in time at the input paths. The path-coupler can e.g. be a beam-splitter, or evanescence coupling between waveguides as a fiber-coupler or waveguide coupler on integrated photonic chip.

A balanced path-coupler is a path-coupler with two input paths and two output paths, where for a photon moving along any of the input paths the probability to leave the path-coupler along the output paths is 50% for each output paths.

A variable path-coupler can be controlled to be a balanced path-coupler or to transmit the inputs as outputs uninfluenced by each other. Such variable path-coupler may for instance be realized as an interferometer with controllable phase or polarization.

A GKP qubit is a Gottesman-Kitaev-Preskill qubit preferably as presented in Phys. Rev. A 65, 012310 (2001).

SUMMARY OF THE INVENTION

Considering the prior art described above, it is an object of the present invention to present an experimentally simple measurement-based computation scheme suitable for topological error correction, where the scheme is simple to realize also when the scheme is scaled up.

The object can be achieved by means of a measurement based photonic quantum computing system comprising an optical input generator configured for receiving first optical paired inputs, and second optical paired inputs, inducing a first predefined relative time delay into each optical paired inputs for making one mode of the first and one mode of the second optical paired inputs into coexisting optical inputs, representing a logic level of the quantum computing system, a delocalized measurement architecture configured for optically interfering coexisting optical inputs for generating intermediate outputs, optically interfering by first and second variable path-couplers for each intermediate output a first mode of the intermediate outputs to a second mode of first or second neighboring intermediate outputs, respectively, for generating interfered outputs, and detecting by two optical detectors, preferably homodyne optical detectors, each mode of the intermediate outputs and the interfered outputs, such that the delocalized measurement architecture is configured for gate implementation of the quantum computing system.

The optical input generator is configured for receiving first optical paired inputs, and second optical paired inputs, wherein the second optical paired inputs are received later than the first optical paired inputs.

The optical input generator delays one mode of the first optical paired inputs and one mode of the second optical paired inputs by the first predefined relative time delay, so that after the first predefined relative time delay the delayed mode of the first optical paired inputs becomes coexisting with the non-delayed mode of the second optical paired inputs and together form coexisting optical inputs. Since optical paired inputs can be received all the time there can be new coexisting optical inputs formed all the time. The optical paired inputs can arrive constantly, separated by one time unit.

The formed coexisting optical inputs are interfered with each other for generating intermediate outputs. A balanced path-coupler can be used for generating the intermediate outputs. The balanced path-coupler could be called a second balanced path-coupler.

A first mode of the intermediate outputs can be interfered by a first variable path-coupler or a second variable path-coupler with a second mode of a first or a second neighboring intermediate outputs, respectively, for generating interfered outputs. Alternatively, the first mode of the intermediate outputs is not interfered by the first or the second variable path-couplers. So for each intermediate outputs, the first and the second variable path-couplers can be controlled so that one mode of the intermediate outputs is interfered by the first variable path-coupler, by the second variable path-coupler or by none of the first or second variable path-couplers.

A couple of optical detectors, preferably homodyne optical detectors, for detecting the intermediate outputs or the interfered outputs, are positioned after the variable path-couplers. If the interfered outputs are not further interfered, the interfered outputs will be detected by the optical detectors. If interfered outputs are generated by the first or the second variable path-couplers, interfered outputs will be detected by the optical detectors.

The measurement based photonic quantum computing system is a simple system or architecture that is easily scalable to become a functioning quantum computer. The balance path-couple, first and second variable path-coupler, and optical detectors comprise a delocalized measurement device or architecture causing the measurement based photonic quantum computing system to be fault tolerant when provided with suitably prepared input states, like e.g. the GKP states.

The delocalized measurement architecture implements a two mode gate if one of the two variable path-couplers interferes the first mode of the intermediate outputs to the second mode of the first or second neighboring intermediate outputs or a single mode gate if both of the two variable path-couplers are open and do not interfere any mode.

A measurement basis of a detector can be variable and be defined by $\theta$ (theta). For a homodyne detector, theta corresponds to the relative phase between the optical detector input field and the detector optical local oscillator field. By varying $\theta$ to control the measurement bases of different outputs (interfered, or non-interfered, outputs from the variable path-coupler), the delocalized measurement architecture can be controlled to implement certain quantum logic gates and perform a certain calculation on the coexisting optical inputs at the logic level.

Suppose that the received first optical paired inputs are an input mode, $|\psi_{in}\rangle$, paired with some other mode, wherein the $|\psi_{in}\rangle$ is the mode, on which the calculation is to be performed, and wherein the $|\psi_{in}\rangle$ is time delayed by the first predefined relative time delay in relation to the other mode. Suppose that the received second optical paired inputs are the two modes of an entangled two-mode squeezed state. One of the modes will be coexisting at the logic level with $|\psi_{in}\rangle$, and the delocalized measurement architecture can be controlled to perform calculations on the $|\psi_{in}\rangle$.

By setting the same measurement bases of the two detectors and open the variable path-couplers so that the variable path-couplers do not interfere anything, the coexisting optical inputs at the logic level can be read out by the detectors.

The first predefined relative time delay enables a teleportation of the first modes of the coexisting optical inputs at the logic level, which enables computation on a number of coexisting optical inputs by the delocalized measurement architecture and enables the readout of the coexisting optical inputs at the logic level by the detectors.

The delocalized measurement architecture with the interference of the coexisting optical inputs for generating the intermediate outputs and the two variable path-couplers enables a number of input modes and entangled modes to be arranged in a three dimensional network, wherein each mode can be interfered with a neighboring mode. With gate implementation by projective measurements in one dimension, two dimensions are left for encoding of information with nearest neighbor interaction ideal for topological error correction.

The first and the second variable path-couplers can also be configured for being open, wherein the first and/or the second variable path-couplers are controlled not to interfere with anything or not to interfere the first mode of the intermediate outputs with anything or any other mode. The first and second variable path-couplers are designed such as the level of coupling between a given pair of modes can be changed for every consecutive mode arriving one time unit apart.

In an embodiment, the delocalized measurement architecture can be further configured for inducing a second predefined relative time delay into each intermediate outputs.

Inducing the second predefined relative time delay into each intermediate outputs before the first mode of the intermediate outputs is possibly interfered by the first or the second variable path-couplers means that the first mode of the intermediate outputs which is coexisting before the second predefined relative time delay with a second mode of the intermediate outputs will after the second predefined relative time delay be coexisting with a second mode of another intermediate outputs, which were generated at a later time by the second balanced path-coupler.

The second mode of the other intermediate outputs can be the second mode of the first or the second neighboring intermediate outputs with which the first mode of the intermediate outputs is interfered by the first or the second variable path-coupler.

That means that the system is temporally encoded which requires a minimum amount of spatial resources, wherein the delocalized measurement architecture can be controlled between implementing a two-mode gate, a single mode gate, or for readout of the coexisting optical inputs at the logic level.

In an embodiment, the delocalized measurement architecture can be further configured for inducing a third predefined relative time delay into each interfered outputs.

By adding the third predefined relative time delay in addition to the second predefined relative time delay, wherein the second predefined relative time delay is before the first variable path-coupler and the third predefined relative time delay is after the first variable path-coupler but before the second variable path-coupler, the first and the second neighboring intermediate outputs will be two intermediate outputs, which were generated at different later times compared to the intermediate outputs.

A first mode of each of the first and the second neighboring intermediate outputs will eventually possibly be interfered by the first or the second variable path-couplers with a second mode of other first and second neighboring intermediate outputs for possibly generating other interfered outputs.

In this way, the three-dimensional network of the coexisting optical inputs, which represent logic levels, can be arranged so that the interference of the first mode of the intermediate outputs to the second mode of the first or the second neighboring intermediate outputs can be realized in a truly temporally encoded system which requires a minimum amount of spatial resources.

In an embodiment, the first relative time delay can be n times m time units, and wherein the second relative time delay is 1 time unit and the third relative time delay is n−1 time units.

In this way, the three-dimensional network of the coexisting optical inputs can be arranged so that the interference of the first mode of the intermediate outputs to the second mode of the first or the second neighboring intermediate outputs can be realized in a temporally encoded system, wherein the second mode of the first or the second neighboring intermediate outputs is in the three-dimensional network a neighbor to the first mode of the intermediate outputs. This enables that the interference between neighboring modes can be realized in a temporally encoded system.

In an embodiment, the first optical paired inputs and the second optical paired inputs can be received n times m time units apart.

In an embodiment, the delocalized measurement architecture can be configured for time-delaying the first mode of the intermediate outputs by
  a. the second predefined relative time delay, or
  b. the second and the third predefined relative time delays relative to the second mode of the first or the second neighboring intermediate outputs, respectively, for causing the first mode of the intermediate outputs to be coexisting with the second mode of the first or the second neighboring intermediate outputs at the first or the second variable path-coupler, respectively.

The advantage is that the computation of the coexisting optical inputs that can be implemented by the delocalized measurement architecture can be realized in a temporally encoded system.

In an embodiment, the measurement based photonic quantum computing system can comprise n times m sets of the optical input generator and the delocalized measurement architecture.

This embodiment presents many parallel sets of the optical input generator and the delocalized measurement architecture. This embodiment presents a partly spatially encoded system ideal for photonic integrated circuit, on which the sets can easily be produced according to known manufacturing techniques.

This embodiment enables the input modes and the entangled modes to be arranged in a three-dimensional network based on a partly spatially encoded system with two spatial dimensions and one temporal dimension. The three-dimensional network with gate implementation by projective measurements in one dimension and with two dimensions left for encoding of information with nearest neighbor interaction is ideal for the topological error correction.

In an embodiment, the second mode of the first or the second neighboring intermediate outputs can be an intermediate output of a first or a second set of the optical input generator and the delocalized measurement architecture different from the set of the optical input generator and the delocalized measurement architecture of the first mode of the intermediate outputs.

This embodiment presents how the input mode of the coexisting optical inputs can be interfered with input modes and entangled modes of any of the two neighboring parallel sets of the optical input generator and the delocalized measurement architecture arranged in the two dimensional network in a partly spatially encoded system.

In an embodiment, the first predefined relative time delay can be one time unit, and the first and the second optical paired inputs are received one time unit apart.

In an embodiment, the optical input generator comprises a two-mode squeezing generator configured for generating the optical paired inputs, such as an entangled two-mode squeezed state, wherein the two-mode squeezing generator can preferably be a first two-mode gate, such as a first balanced path-coupler or a controlled-Z gate, a parametric down-convertor or a four-wave mixer.

The parametric down-convertor can be anything that is able to generate the optical paired inputs by parametric down-conversion. The parametric down-convertor may need optical inputs for generating the optical paired inputs.

The four-wave mixer can be anything that is able to generate the optical paired inputs by four-wave mixing. The four-wave mixer may need optical inputs for generating the optical paired inputs.

The first two-mode gate can be configured for interfering optical inputs for generating the received optical paired inputs. The first two-mode gate can be a first balanced path-coupler, such as a first balanced beam-splitter. The first two-mode gate can also be a controlled-Z gate, which can be implemented by a quantum nondemolition interaction or with additional squeezers and beam-splitters, followed by a phase shift, see e.g. N. C. Menicucci et al., Phys. Rev. Lett. 97, 110501 (2006), in particular p. 2-3.

The entangled two-mode squeezed state can be generated by interfering two squeezed vacuum states on a balanced path-coupler, such as a balanced beam-splitter, by parametric down-conversion or by four-wave mixing.

In an embodiment, the optical input generator can comprise a two-mode entangled GKP qubits generator, configured for interfering or coupling optical inputs for generating the optical paired inputs, such as two entangled GKP qubits, wherein the two-mode entangled GKP qubits generator can preferably be a first two-mode gate, such as a first balanced path-coupler or a controlled gate, or a two-mode control-gate.

The GKP states of encoded 1-level systems are also known as GKP grid states or GKP qunaught states, whereas a GKP qubit encodes a 2-level system.

The two entangled GKP qubits can be generated by interfering two GKP qunaught states (encoded 1-level systems) on a balanced path-coupler, such as a balanced beam-splitter, or by interfering or coupling two GKP qubits with a two-mode control-gate.

The two entangled GKP qubits can be used for GKP error correction that is a suitable supplement to topological error correction. In GKP encoding and error correction a qubit, i.e. a GKP qubit, is encoded in the continuous variable field quadratures of the optical electromagnetic field, and the continuous variable noise in the field quadratures is corrected with the cost of potential qubit errors on the encoded GKP qubit.

In an embodiment, the optical input generator can comprise two first switches configured for switching continuously between a. a first position configured for transferring squeezed vacuum states, $|0\rangle_{Sq}$, as optical inputs, and b. a second position configured for transferring GKP states of encoded 1-level systems, $|0\rangle_{GKP}$, as optical inputs to the first balanced path-coupler, or the optical input generator can comprise two second switches configured for switching continuously between c. a first position configured for transferring an entangled squeezed vacuum state as optical paired inputs, and d. a second position configured for transferring an entangled GKP state as optical paired inputs The two first switches or the two second switches can switch to interchangeably transfer optical paired inputs into which the first predefined relative time delay is induced.

The two first switches or the two second switches can switch to interchangeably transfer squeezed vacuum states or GKP states of encoded 1-level systems, $|0\rangle_{GKP}$, as optical inputs to the first two-mode gate.

The two second switches can be positioned to receive interfered output from the parametric down-convertor, the four-wave mixer, or the first two-mode gate on the one hand and from the first two-mode gate or the two-mode control-gate on the other hand.

In an embodiment, the optical input generator can comprise a. a first time-delay unit configured for performing the first predefined relative time delay, wherein the first time-delay unit comprises an input and an output, and b. a second switch positioned at the input or the output of the first time-delay unit, wherein the second switch in a closed position is configured for transferring a state of encoded information, such as a GKP-qubit state, $|\psi\rangle_{GKP}$, to the input or the output of the first time-delay unit.

In this way, the the input of encoded information can be introduced into the optical input generator and into the measurement based photonic quantum computing system.

The invention also relates to a second measurement based photonic quantum computing system comprising a number, from 1 to N, of the measurement based photonic quantum computing systems as disclosed herein, wherein each of the number of measurement based photonic quantum computing systems is configured for transferring a. one mode of the first optical paired inputs of each of the N measurement based photonic quantum computing systems to be coexisting with another mode of the first optical paired inputs of the next measurement based photonic quantum computing system, or b. one mode of the coexisting optical inputs of each measurement based photonic quantum computing system to be coexisting with another mode of coexisting optical inputs of the next measurement based photonic quantum computing system, wherein the next measurement based photonic quantum computing system for the Nth measurement based photonic quantum computing system is the first measurement based photonic quantum computing system.

The repetition rate of the input generators, together with optical loss, sets an upper limit of how large n and m can be, particularly for the temporally encoded version, limiting the scalability. The second measurement based photonic quantum computing system overcomes this problem of limited scalability, since parallel sets of the measurement based photonic quantum computing system can be connected to each other, wherein the optical paired inputs can be transferred between the parallel sets of the measurement based photonic quantum computing system.

If there are three or more sets of the measurement based photonic quantum computing system, an optical router can be used, wherein the optical router receives one mode of the optical paired inputs or of the coexisting optical inputs from the three or more sets and distributes the one mode of the optical paired inputs or of the coexisting optical inputs back to the sets. The optical paired inputs can be distributed back to the set from which the optical paired inputs came or to another set. The order of the distribution of the modes from the optical router to the sets can be in any order and can be static or switch with time. The optical router can be controlled how to distribute the modes from the optical router. The optical router can be controlled to distribute the modes from the optical router continuously in any predetermined way.

There can be two options for the position of the optical router. In the first option, the optical router of each measurement based photonic quantum computing system is positioned before the first delay unit or whatever is causing the first delay. In the second option, the optical router of each measurement based photonic quantum computing system is positioned after the first delay unit or whatever is causing the first delay.

In the first option, the one mode of the first optical paired inputs of each of the N measurement based photonic quantum computing systems will be transferred to become coexisting with the other mode of the first optical paired inputs of the next measurement based photonic quantum computing system. The measurement based photonic quantum computing system can be in any order, so that for each measurement based photonic quantum computing system one mode of the first optical paired inputs is transferred to another measurement based photonic quantum computing system, and so that for each measurement based photonic quantum computing system one mode of the first optical paired inputs is received from another measurement based photonic quantum computing system. Each mode can be transferred once and received once. The second optical paired inputs can of course be transferred and received as the first optical paired inputs.

The second option will be like the first option except that the transferred and received modes are of the coexisting optical inputs instead of the first (and the second) optical paired inputs.

The invention also relates to a temporal delocalized measurement device, comprising a. a balanced path-coupler configured for interfering received coexisting optical inputs and for interfering received first or second neighboring coexisting optical inputs for generating intermediate outputs, and for generating first or second neighboring intermediate outputs, respectively, b. a second time delay unit and a third time delay unit, c. first and second variable path-couplers positioned after the second and the third time delay unit, respectively, and d. two optical detectors, preferably two homodyne optical detectors, wherein the second time delay unit and the third time delay unit are configured for inducing a second predefined relative time delay and a further third predefined relative time delay, respectively, into each of the intermediate outputs and into the first or second neighboring intermediate outputs for causing a first mode of the intermediate outputs to be coexisting with a second mode of the second or the third neighboring intermediate outputs at the first or at the second variable path-coupler, respectively, wherein the first and the second variable path-couplers are configured for optically interfering the first mode of the intermediate outputs and the second mode of the second or the third neighboring intermediate outputs, respectively, for generating interfered outputs, and wherein the two optical detectors are configured for detecting each one of the intermediate outputs and the interfered outputs.

The second time delay unit does not require a first time delay unit, but the second time delay unit and the third time delay unit are given these names to connect to the second and third time delay in the previous embodiments.

The first and the second variable path-couplers can also be configured for being open, wherein the first and/or the second variable path-couplers are controlled not to interfere anything or not to interfere the first mode of the intermediate outputs with anything or any other mode.

The temporal delocalized measurement device may also have any, any combination of or all feature(s) as presented above regarding the delocalized measurement architecture.

The invention also relates to a delocalized measurement architecture configured for optically interfering coexisting optical inputs for generating intermediate outputs, optically interfering by first and second variable path-couplers for each intermediate outputs a first mode of the intermediate outputs to a second mode of first or second neighboring intermediate outputs, respectively, for generating interfered outputs, and detecting by two optical detectors, preferably homodyne optical detectors, each mode of the intermediate outputs and the interfered outputs, such that the delocalized measurement architecture is configured for gate implementation of the quantum computing system.

This delocalized measurement architecture may also have any, any combination of or all feature(s) as presented above regarding the delocalized measurement architecture combined with the optical input generator described above.

The invention also relates to a plurality of n times m spatial delocalized measurement devices, each comprising a. a balanced path-coupler configured for interfering received first and second coexisting optical inputs and for generating first and second intermediate outputs, b. first and second variable path-couplers for the first intermediate output, c. first and second variable path-couplers for the second intermediate output, and d. a first and a second optical detectors, preferably two homodyne optical detectors, wherein the first and the second variable path-couplers for the first intermediate output of an $i^{th},j^{th}$ spatial delocalized measurement device of the spatial delocalized measurement devices are configured for interfering the first intermediate output and a second intermediate output of an $i+1^{th},j^{th}$ spatial delocalized measurement device or for interfering the first intermediate output and a second intermediate output of an $i^{th},j+1^{th}$ spatial delocalized measurement device, respectively, for generating a first interfered output wherein the first and the second variable path-couplers for the second intermediate output of the $i^{th},j^{th}$ spatial delocalized measurement device are configured for interfering the second intermediate output and a first intermediate output of an $i-1^{th},j^{th}$ spatial delocalized measurement device or for interfering the second intermediate output and a first intermediate output of an $i^{th},j-1^{th}$ spatial delocalized measurement device, respectively, for generating a second interfered output wherein the first and second optical detectors are configured for simultaneously detecting the first intermediate output or the first interfered output, and the second intermediate output or the second interfered output, respectively.

The first and the second variable path-couplers can also be configured for being open, wherein the first and/or the second variable path-couplers are controlled not to interfere anything or not to interfere the first mode of the intermediate outputs with anything or any other mode.

BRIEF DESCRIPTION OF THE DRAWINGS

The invention will in the following be described in greater detail with reference to the accompanying drawings.

SHORT PRESENTATION OF THE DRAWINGS

Figure 1A:
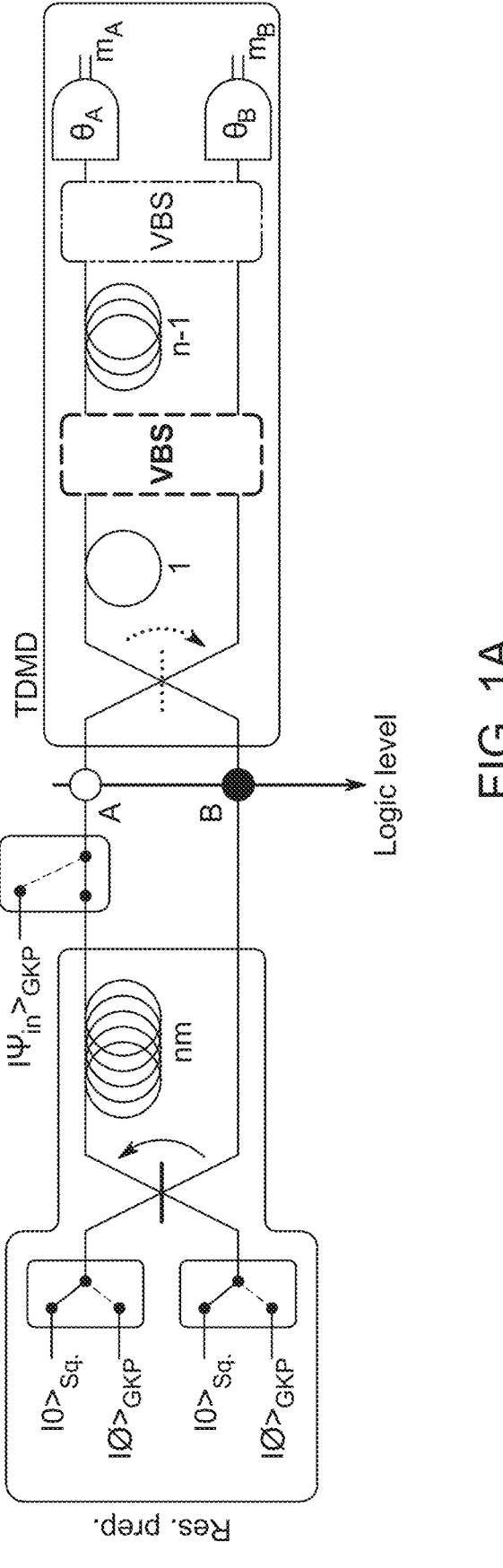
FIG. 1a is a schematic view of a temporally encoded computation scheme setup.

FIG. 1*a* shows a temporally encoded computation scheme setup. The scheme consists of three parts: The resource preparation (res. prep.); the logic level where computation takes place; and the temporal delocalized measurement device (TDMD) for gate implementation by projective measurements. This scheme utilizes temporal multiplexing of two spatial modes, A and B, marked in the logic level.

Figure 1B:
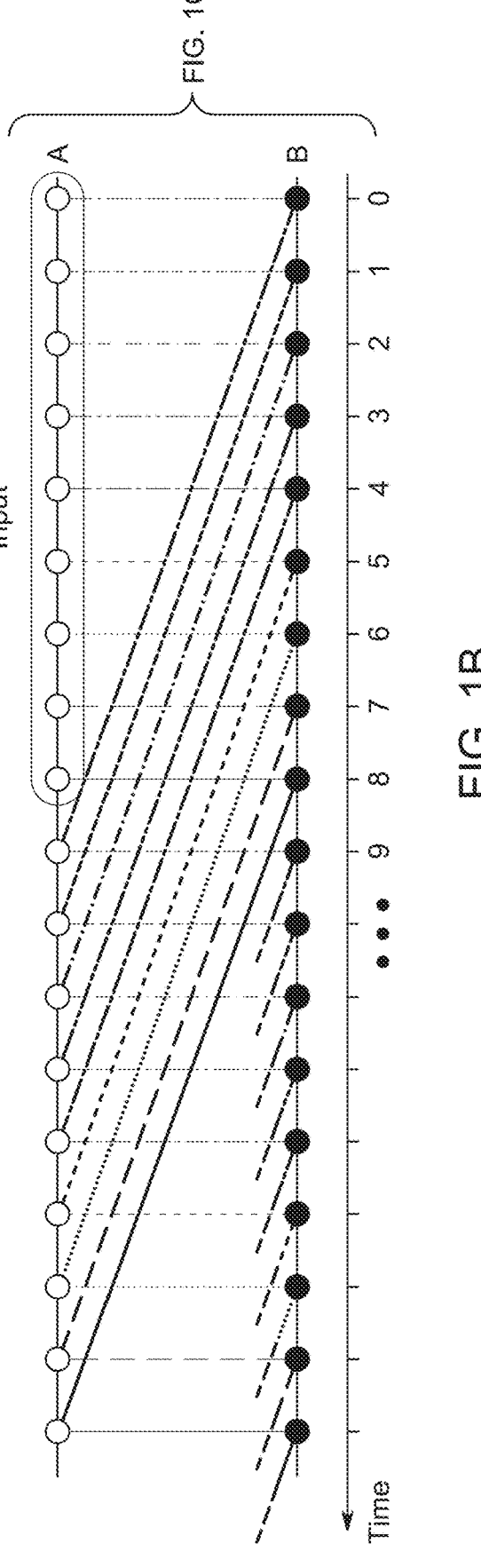
FIG. 1b is a schematic view of wires of two-mode entanglement in the logic level.

FIG. 1*b* shows wires of two-mode entanglement in the logic level shown in the time domain, here for the simple case of nm=9, where n=3 and m=3. Bold lines represent two-mode entanglement, while thin lines indicate temporal overlap of A and B. The wires begin with nm input states in temporal mode 0 to 8, switched in using an optical switch in A of the logic level. The colors of the wires have no physical meaning and are simply used to indicate different wires.

Figure 1C:
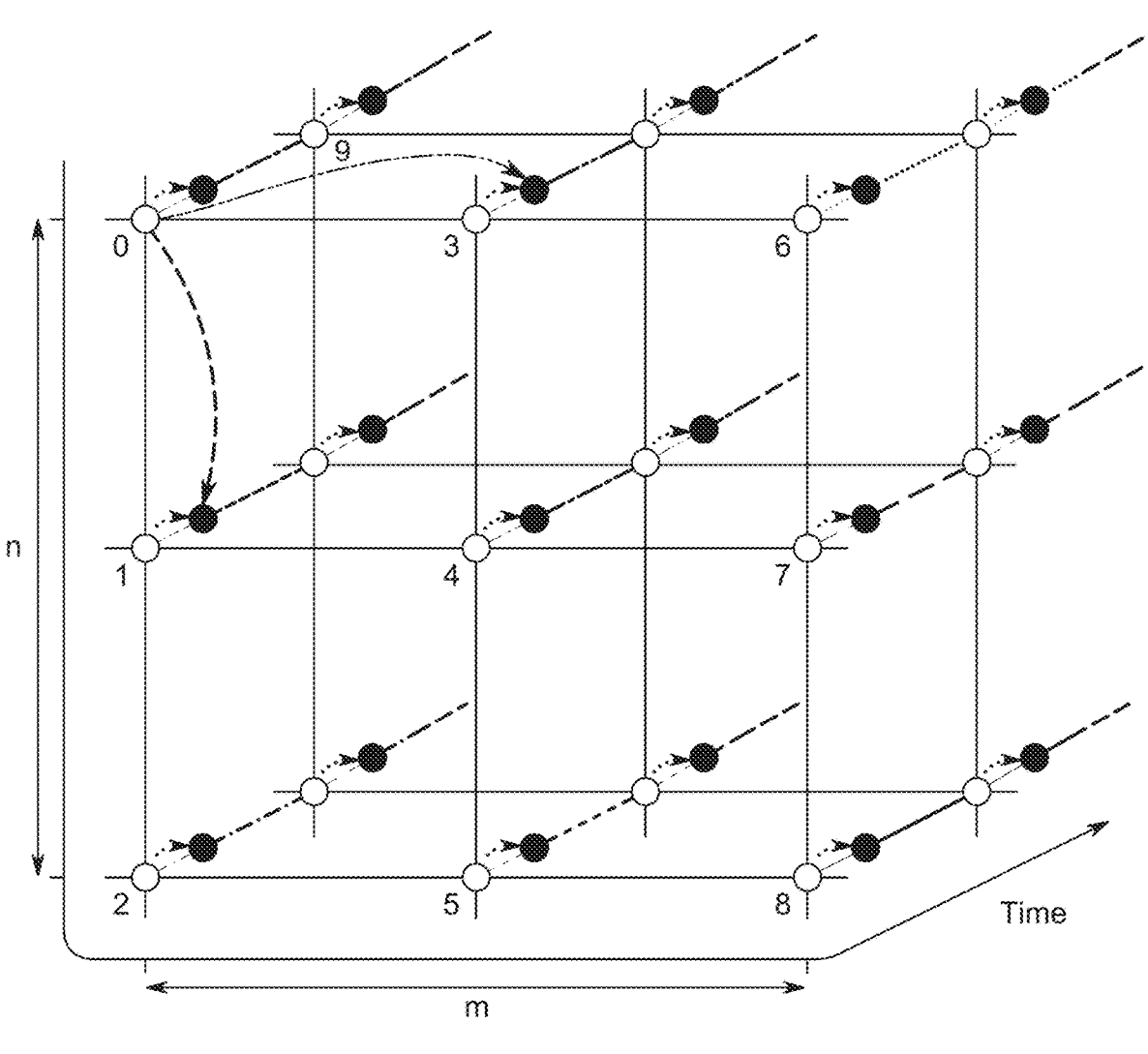
FIG. 1c is a schematic view of wires rearranged into a 3D time lattice with an n×m end surface.

FIG. 1*c* shows wires rearranged into a 3D time lattice with an n×m end surface encoding the input while gates are implemented by teleportation along the third dimension. Here the red arrow represents the first beam-splitter of the TDMD, while the dotted blue and green arrows represent the variable beam-splitters of the TDMD. The first 10 temporal modes of FIG. 1*b* are labeled in FIG. 1*c*.

Figure 2:
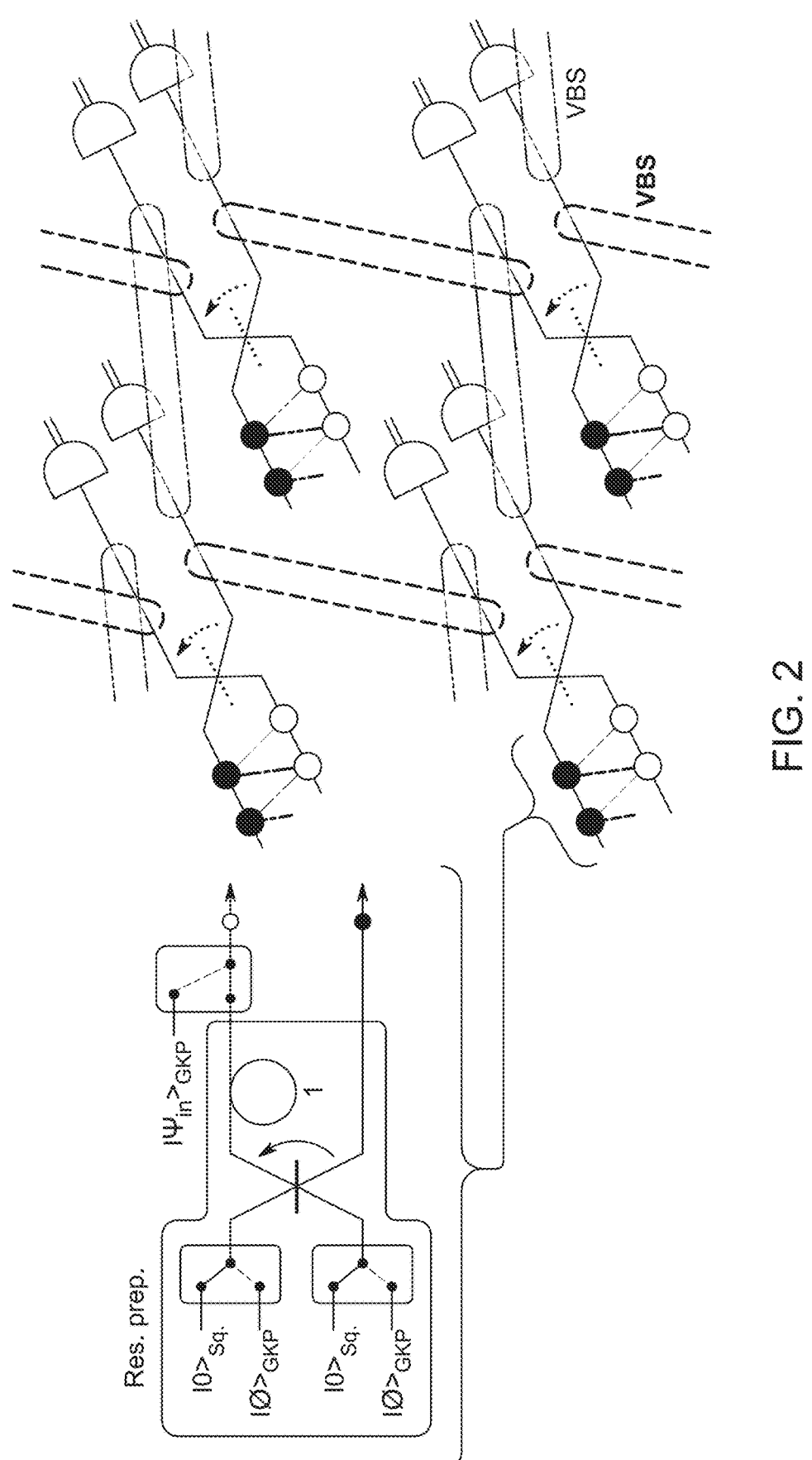
FIG. 2 is a schematic view of spatial encoded version of the computation scheme.

FIG. 2 shows spatial encoded version of the computation scheme illustrated in FIG. 1. Here, each wire is prepared from individual resource preparations and coupled through variable beam-splitters (VBS). The resulting computation scheme is exactly the same as in FIG. 1, but with the 3D time lattice of FIG. 1*c* being encoded in (space)$^2$×time instead of (time)$^3$. Spatial encoding has the advantage of scalability not affecting the computation time, at the cost of requiring spatial scalable resources. As such spatial encoding may be possible on platforms with integrated photonics, whereas temporal encoding may be advantageous in free-space and fiber optical platforms.

Figure 3:
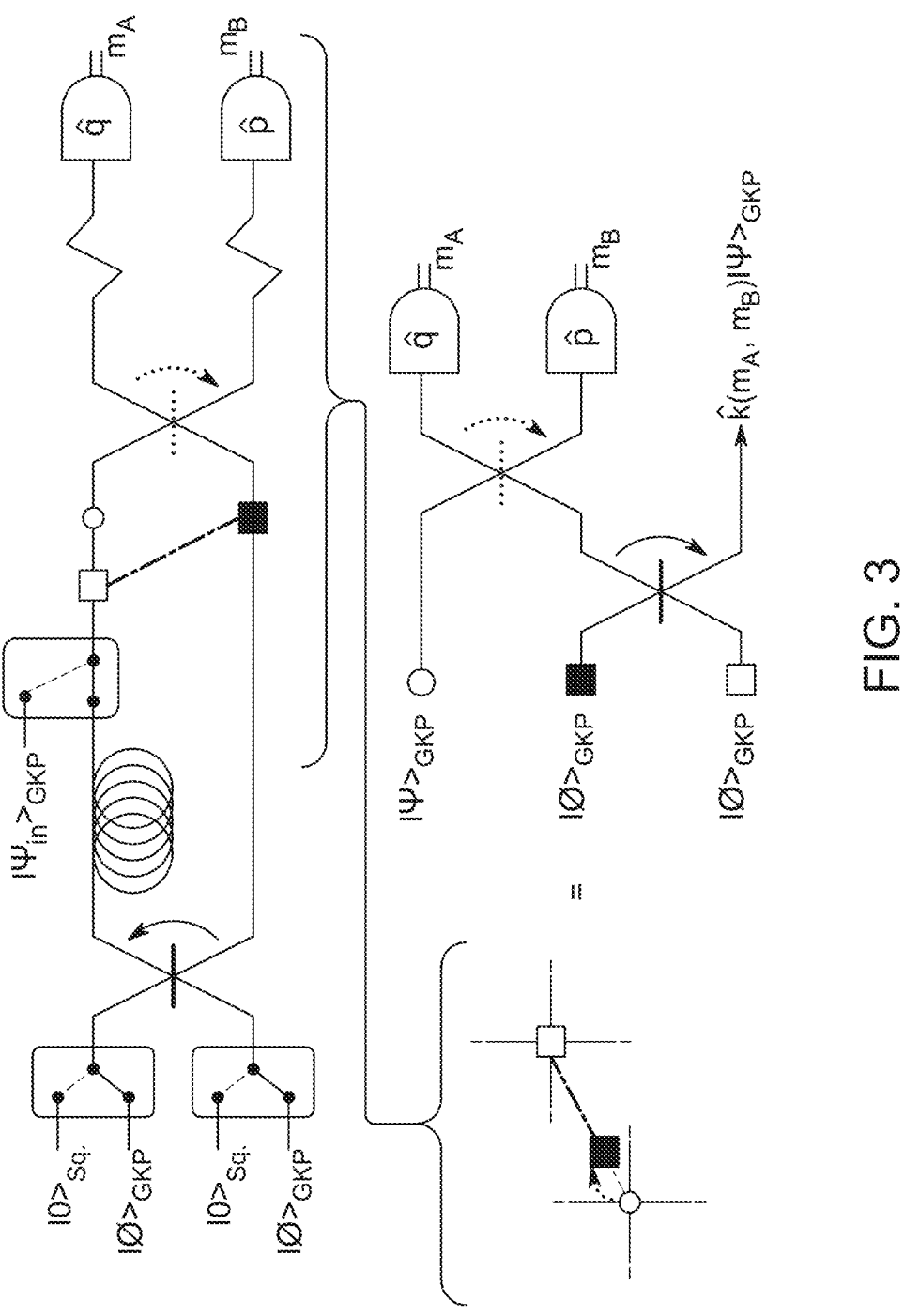
FIG. 3 is a schematic view of an implementation of GKP correction by qubit teleportation.

FIG. 3. Implementation of GKP correction by qubit teleportation. For GKP correction, qunaught states, $|\emptyset\rangle_{GKP}$, are used in the resource preparation preparing a two-mode GKP-qubit Bell-states in the logic level, shown by two connected rectangles. Setting the TDMD to perform a Bell measurement (the two VBSs are open and left out on the figure), a GKP-qubit state, $|\psi\rangle_{GKP}$ shown as a circle, is teleported through the Bell-state and projected into a fresh GKP-qubit state by the Kraus operator in Eq. (5). The corresponding graph is shown on the 3D time lattice of FIG. 1*c* with the corresponding circuit shown as well.

Figure 4A:
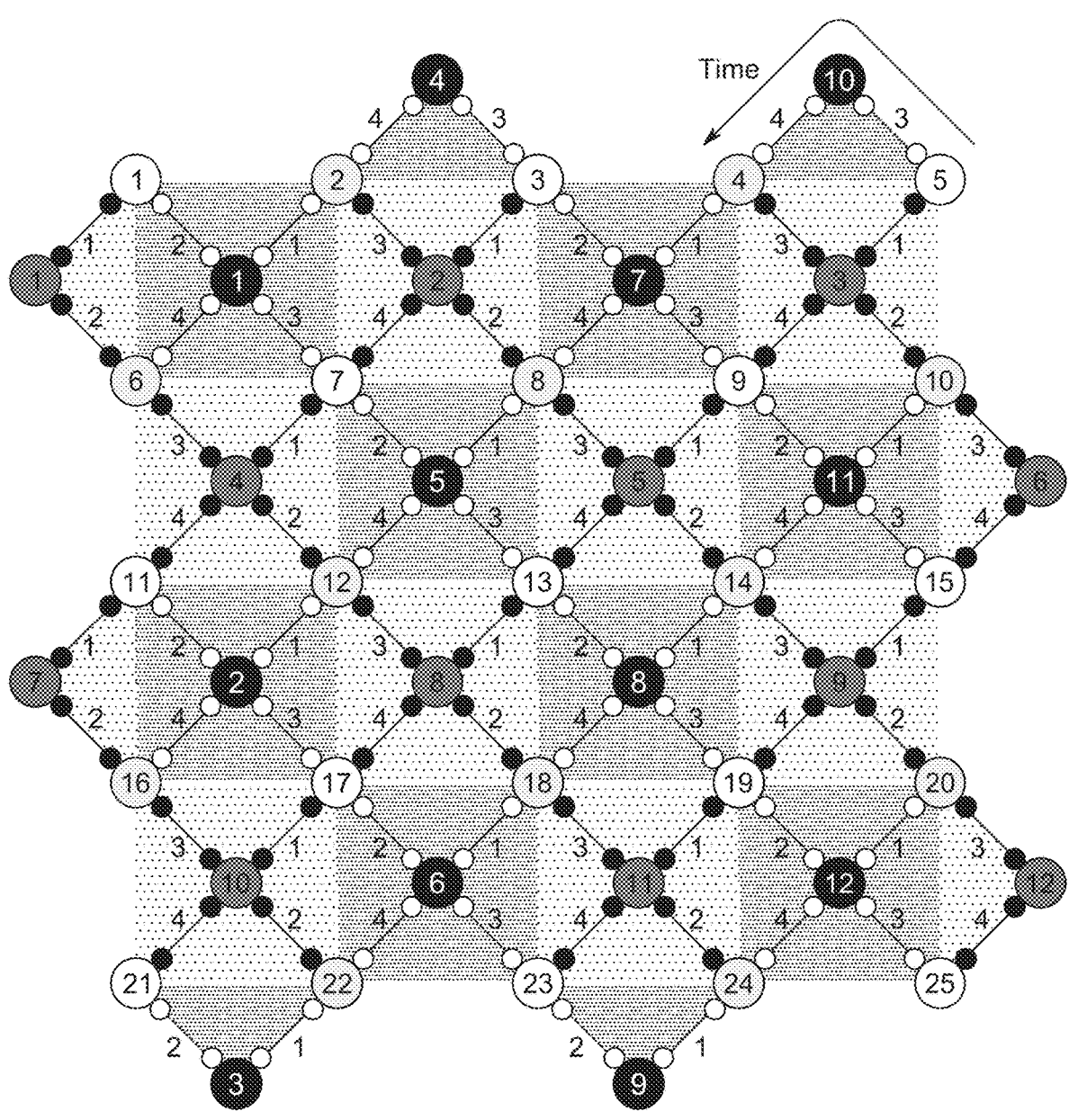
FIG. 4a is a schematic view of one logic qubit of a distance d=5 rotated surface code.

FIG. 4*a* shows one logic qubit of a distance d=5 rotated surface code. White and gray circles represent odd and even data qubits, respectively. Green and red circles represent Z- and X-measure qubits, respectively. The two-mode gate operations are listed in Eq. (7), while labeled 1 to 4 to indicate the order.

Figure 4B:
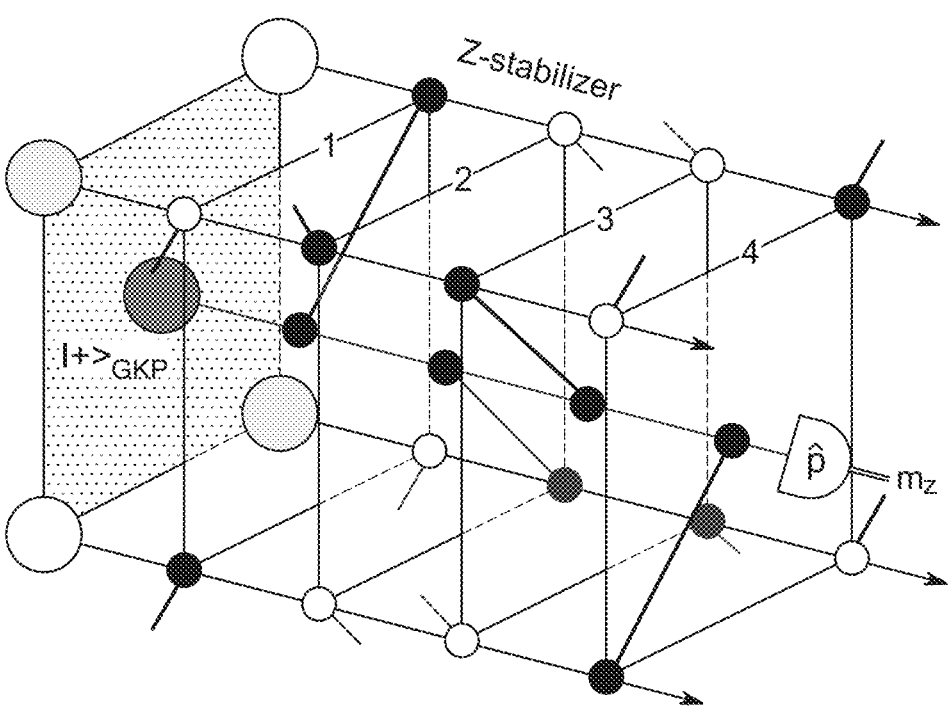
FIG. 4b is a schematic view of one round of syndrome measurements.
Figure 4C:
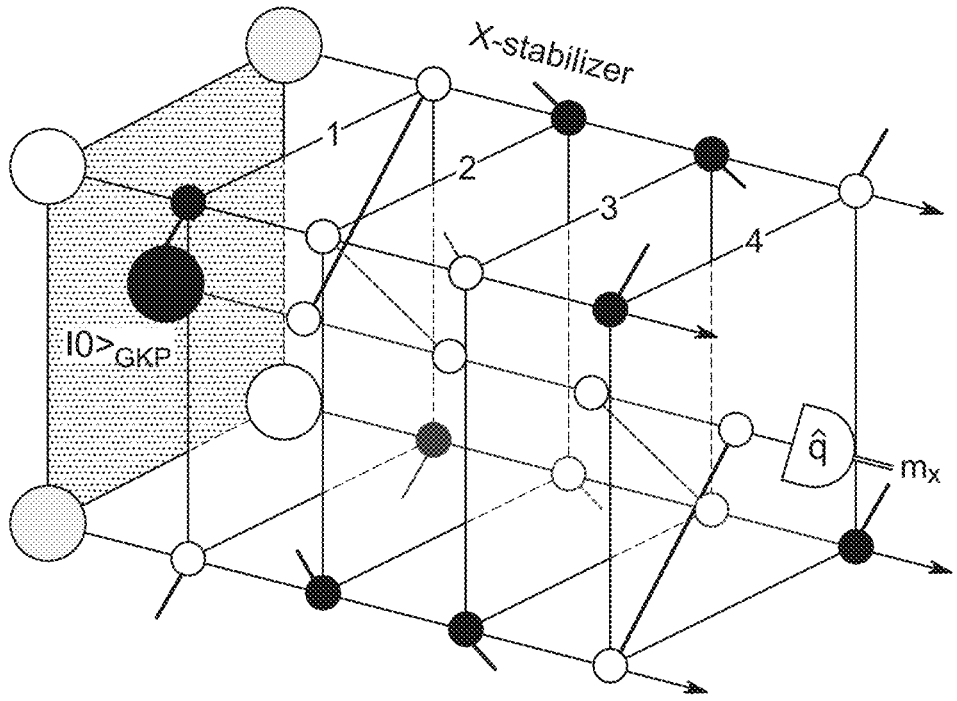
FIG. 4c is a schematic view of one round of syndrome measurements.

FIGS. 4*b* and 4*c* show one round of syndrome measurements including initialization of measure GKP-qubits switched into the logic level of the computation setup, 4 steps of coupling to data qubits by 4 measurement-induced two-mode gates, and finally, measurement using the TDMD. For the surface-GKP code, GKP corrections are performed on data qubits in the beginning of the round, while for the surface-4-GKP code GKP corrections are performed on all qubits after each gate.

Figure 4D:
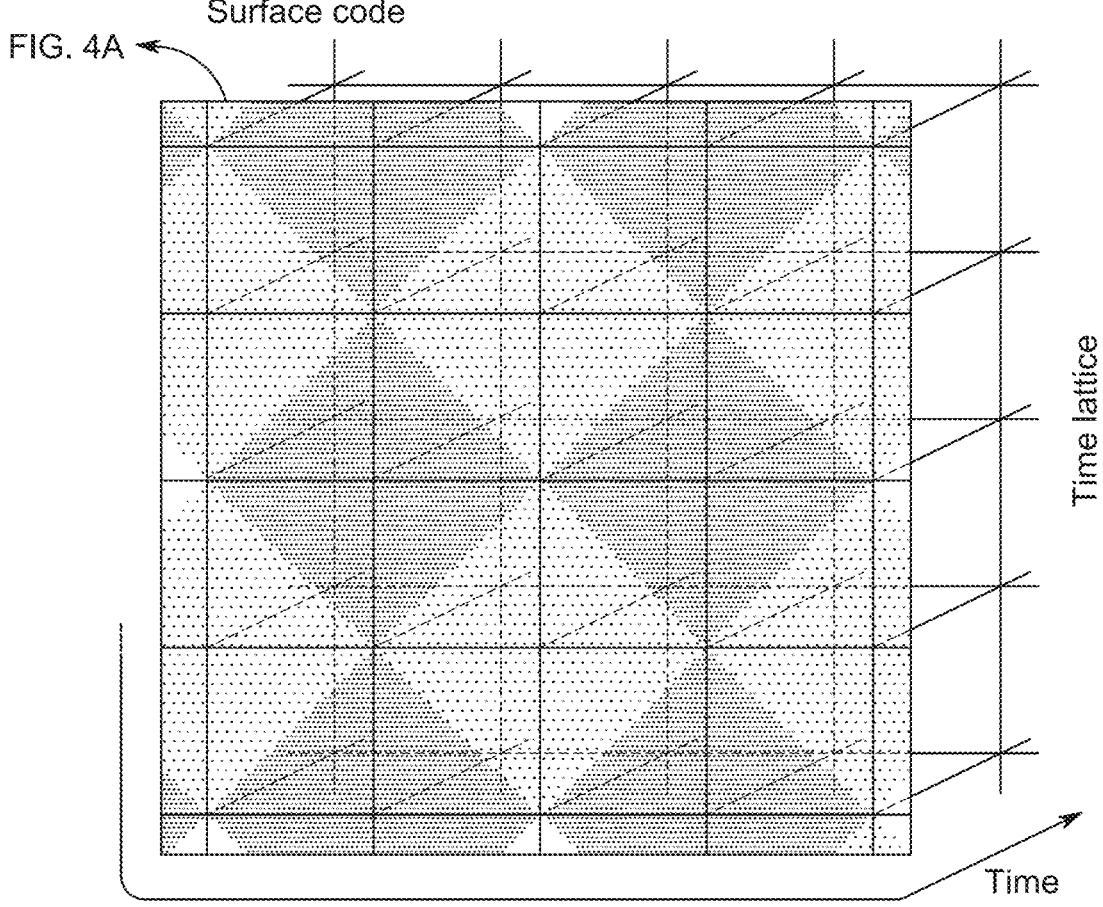
FIG. 4d is a schematic view of orientation of the surface code in the 3D time lattice of the computation scheme in FIG. 1.

FIG. 4*d* shows orientation of the surface code in the 3D time lattice of the computation scheme in FIG. 1. Here the surface code is encoded in two dimensions of the time lattice with vertices corresponding to encoded GKP-qubits, while gates are encoded in each step along the third dimension of the time lattice.

Figure 4E:
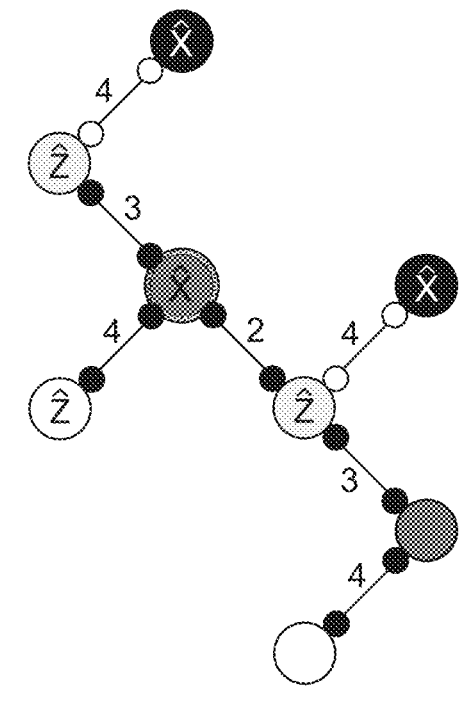
FIG. 4e is a schematic view of an example of qubits errors induced by GKP correction in the surface-4-GKP code.
Figure 4F:
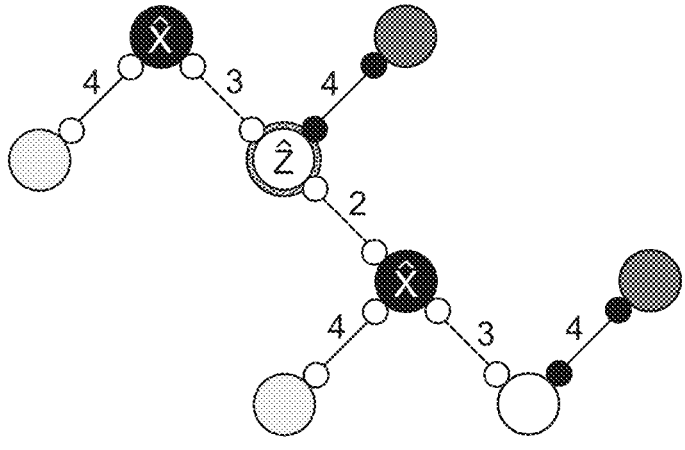
FIG. 4*f* is a schematic view of an example of qubits errors induced by GKP correction in the surface-4-GKP code.

FIGS. 4*e* and 4*f* show examples of qubits errors induced by GKP correction in the surface-4-GKP code. In FIG. 4*e* an $\hat{X}$ qubit error is induced on a measure-Z qubit after the first gate in the syndrome measurement round and propagates to neighboring data and measure-X qubits in the following gates of the round. In FIG. 4*f* a $\hat{Z}$ qubit error is induced in a data qubit after the first gate and propagates to measure-X qubits in the following gates.

Figure 5A:
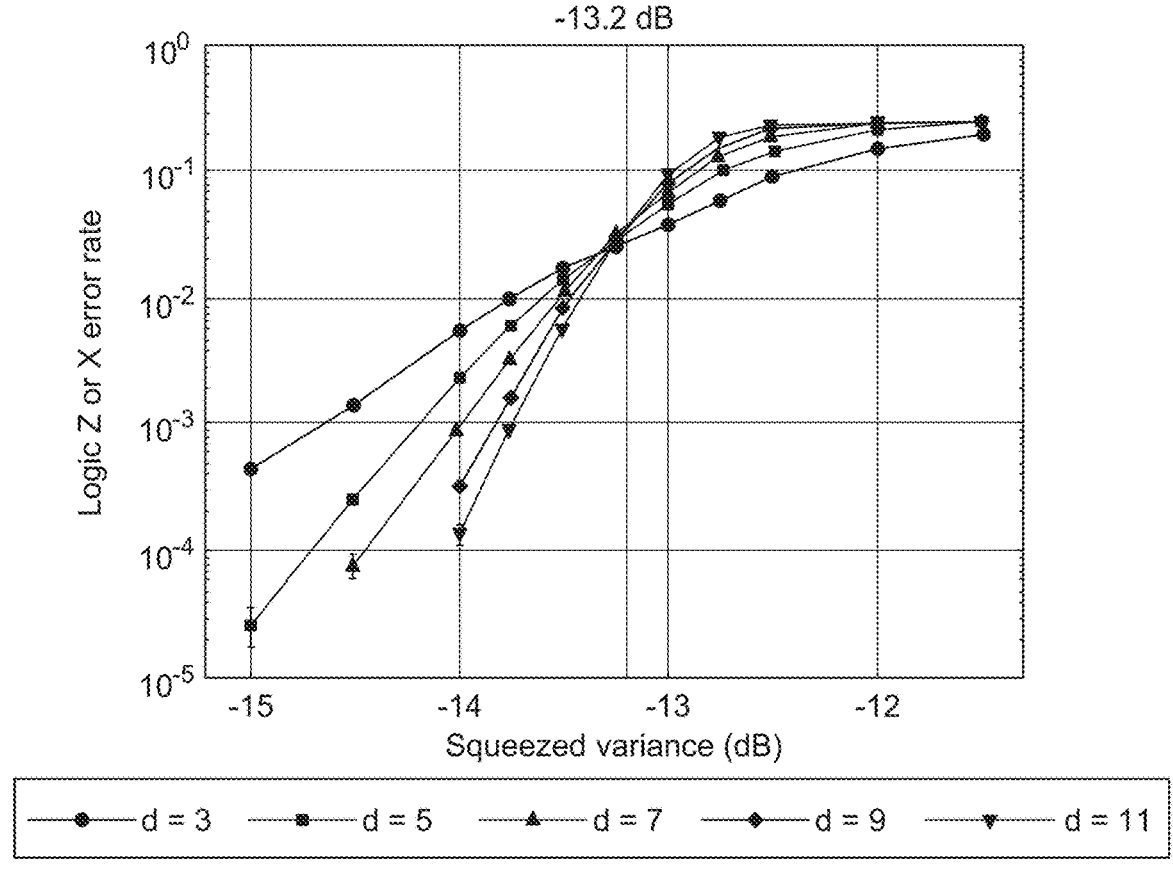
FIG. 5*a* is a schematic view of simulated logic $\hat{Z}$ and $\hat{X}$ error probability.

FIG. 5*a* shows simulated logic $\hat{Z}$ and $\hat{X}$ error probability of the surface-4-GKP code as function of the a $\sigma^2=e^{-2r}/2$ squeezed variance in the $|0\rangle_{Sq}$-states used for gate implementation, leading to gate noise of variance $$\sigma_{gate}^2 = 2\sigma^2$$

in Eq. (3), and equal squeezing in the GKP-qubits encoding the surface code and $|\emptyset\rangle_{GKP}$-states used for quadrature correction, $$\sigma_{GKP}^2 = \sigma^2$$

in Eq. (4). The logic error probability is shown for different code distances d, and the fault-tolerant threshold where the logic error rate decrease with increasing code distance is seen to be at 13.2 dB of squeezing. Error bars of standard deviations are estimated by bootstrapping.

Figure 5B:
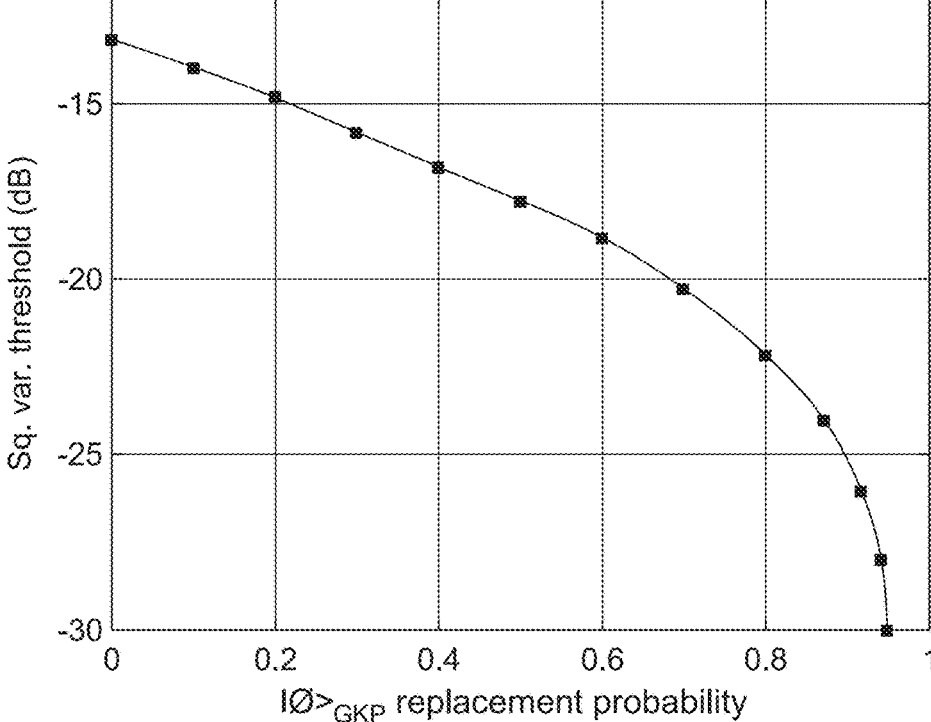
FIG. 5*b* is a schematic view of squeezing threshold of the surface-4-GKP.

FIG. 5*b* shows a squeezing threshold of the surface-4-GKP code as a function of $|\emptyset\rangle_{GKP}$ replacement probability at which a $|\emptyset\rangle_{GKP}$-state for GKP correction is replaced with a $|0\rangle_{Sq}$-state in the resource preparation. Here the threshold is estimated as the crossing point of the d=7 and d=9 logic error rates. For zero replacement probability, the threshold is that of FIG. 5*a*.

Figure 6:
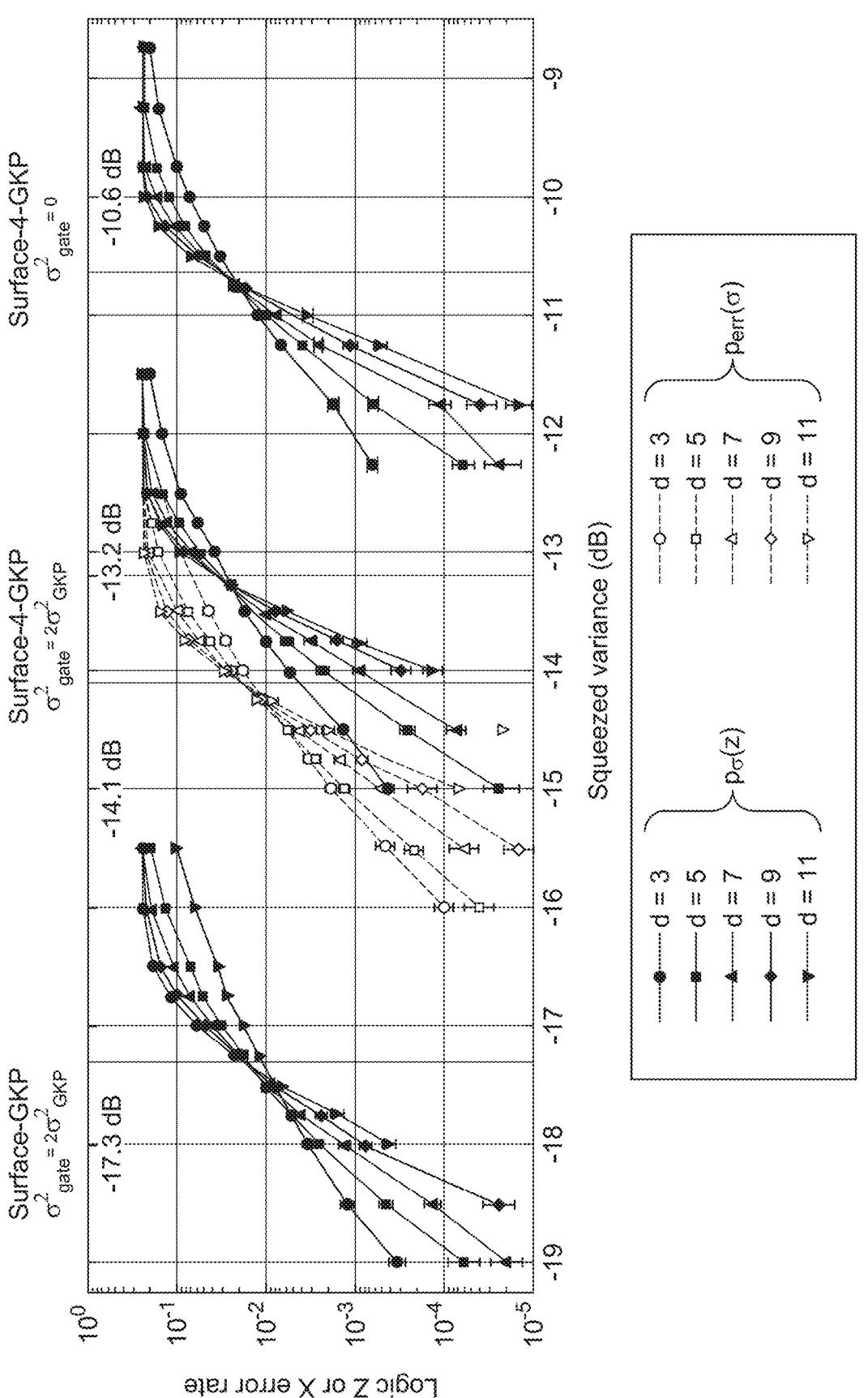
FIG. 6 is a schematic view of simulated logic $\hat{Z}$ and $\hat{X}$ error probability for different cases.

FIG. 6 shows simulation results of all four simulated cases. Here, the case of the surface-4-GKP code using $p_\sigma(z)$ is the results shown in the main text FIG. 5. Error bars of standard deviation is estimated by bootstrapping.

Figure 7:
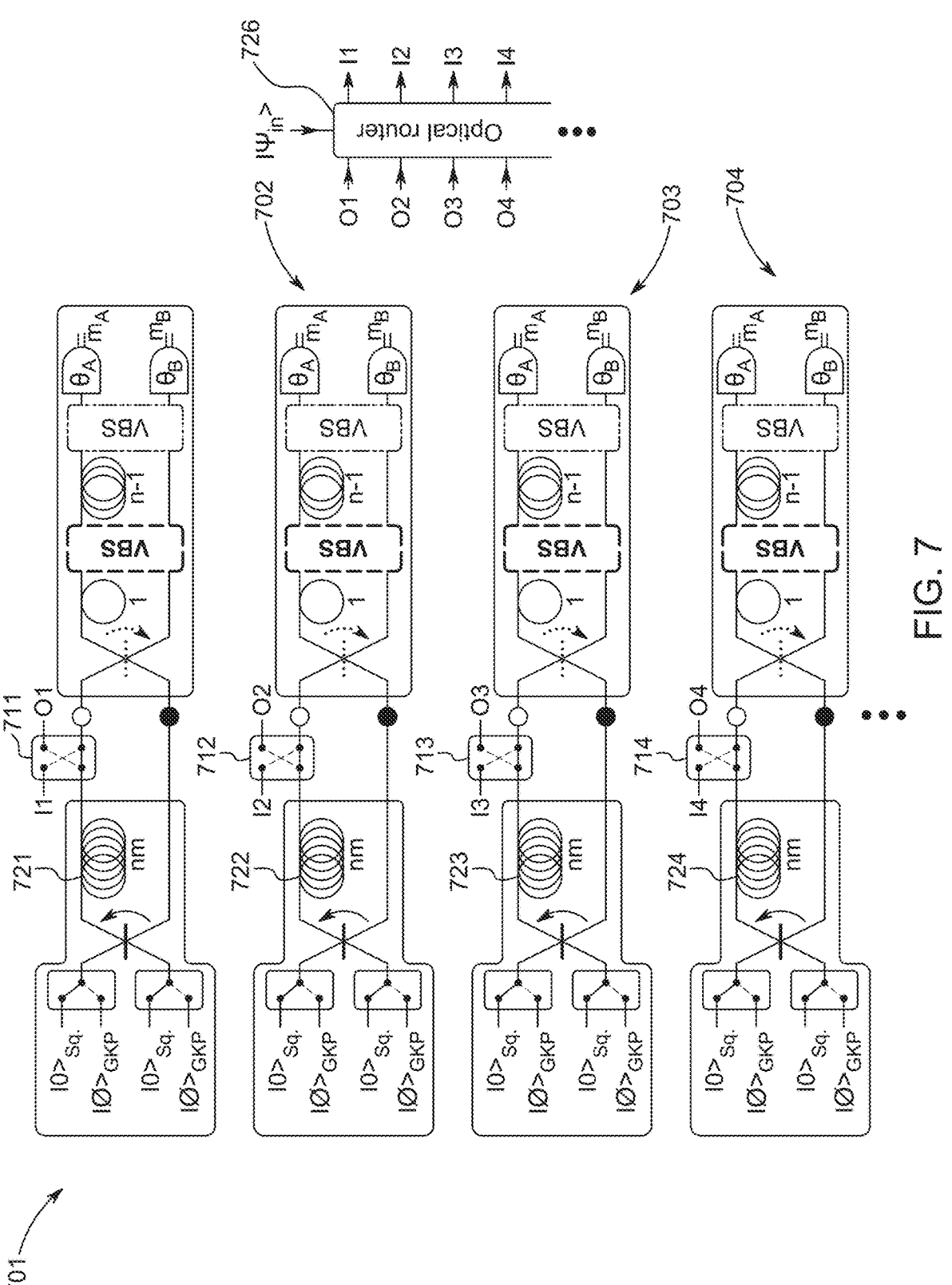
FIG. 7 is a schematic view of second measurement based photonic quantum computing system comprising a number of the measurement based photonic quantum computing systems.

FIG. 7 shows a second measurement based photonic quantum computing system comprising a number (four shown) of the measurement based photonic quantum computing systems, where an optical router receives one mode of the coexisting optical input from each measurement based photonic quantum computing system and distributes the modes individually back to the same or to another measurement based photonic quantum computing system.

DETAILED DESCRIPTION OF THE INVENTION

Computation Scheme

The computation scheme setup is shown in FIG. 1a utilizing temporal encoding, while in FIG. 2 the same computation scheme is shown with spatial encoding. In the following we will focus on the temporal encoded scheme, while all the same methods and results hold as well for the spatial encoded scheme—even a combination of spatial and temporal encoding is possible. For the temporal encoded scheme, the setup consists of resource preparation, the logic level, and a temporal delocalized measurement device (TDMD). As ancillary input for the resource preparation, we switch between squeezed vacuum states, $|0\rangle_{Sq}$, when implementing gates by projective measurements, and GKP qunaught states, $|\varnothing\rangle_{GKP}$, when performing GKP correction. Below, GKP correction with ancillary $|\varnothing\rangle_{GKP}$-states is described, while throughout this section we focus on gate implementation with ancillary $|0\rangle_{Sq}$-states.

In the resource preparation temporally encoded ancillary input of squeezed vacuum states, $0\rangle_{Sq}$, are squeezed along the orthogonal quadratures $(\hat{q}-\hat{p})/\sqrt{2}$ and $(\hat{q}+\hat{p})/\sqrt{2}$ in the spatial modes A and B, respectively. Here, $\hat{q}$ and $\hat{p}$ are the electric field amplitude and phase (or position and momentum) quadratures with ½ vacuum variance for $\hbar=1$. When interfered on the first balanced beam-splitter, two-mode entanglement with $\hat{q}$ $\hat{p}$-correlations is prepared, namely an approximate cluster state equivalent to a two-mode squeezed state phase-rotated by $\pi/4$ in both modes. As unitary operator for balanced beam-splitters we use $$\hat{B} = e^{-i\pi(\hat{q}_i \otimes \hat{p}_j - \hat{p}_i \otimes \hat{q}_j)/4}$$

with corresponding symplectic matrix $$B = \frac{1}{\sqrt{2}}\begin{pmatrix} 1 & -1 & 0 & 0 \\ 1 & 1 & 0 & 0 \\ 0 & 0 & 1 & -1 \\ 0 & 0 & 1 & 1 \end{pmatrix} \qquad \text{Eq. (1)}$$

acting on $(\hat{q}_i, \hat{q}_j, \hat{p}_i, \hat{p}_j)^T$ quadrature vectors, and represented graphically with an arrow pointing from mode i to j. Note, in this work we prepare two-mode cluster states, however, we could as well have considered preparation of two-mode squeezed states which are equivalent to cluster states under phase-rotation that may be absorbed into the measurement bases.

After interfering, temporal modes of A are delay by nm temporal modes, leading to temporal overlap in A and B of two-mode entangled states initially separated by nm temporal modes. The result is nm decoupled wires of two-mode entangled states, illustrated in time domain in FIG. 1(b) for nm=9. Here, each color indicates different wires with the bold lines indicates two-mode entanglement, while the thin lines indicate temporal overlap of A and B. The nm wires constitute the logic level in which computation is performed.

Using an optical switch, nm input modes to the computation can be switched into the logic level at A. In FIG. 1(b) 9 input modes has been switched into A in temporal mode 0 to 8.

The nm wires can be rearranged in a 3D time lattice as shown in FIG. 1(c), where each wire are arranged in a 2D square lattice and extents in the third dimension. As such, information is encoded in a surface while the third dimension is used for computation by teleportation using the TDMD. The TDMD consist of a balanced beam-splitter, two variable beam-splitters (VBS), two delays of 1 and n−1 temporal modes, and two homodyne detectors (HD) in A and B measuring in basis $\hat{q}(\theta)=\hat{q}\cos\theta+\hat{p}\sin\theta$, arranged as in FIG. 1(a). Each VBS can vary between two settings: when implementing single-mode gates, the VBSs are left 'open' such that they do not interfere A and B corresponding to $\hat{1}_A \otimes \hat{1}_B$; when implementing two-mode gates one of the two VBSs are 'enabled' to be a balanced beam-splitter with the symplectic matrix in Eq. (1) interfering A and B. Such VBS may be implemented in various ways, for instance as a Mach-Zehnder interferometer with a controllable phase in one arm, or by polarization control combined with polarization-dependent beam-splitters.

When the VBSs are left open, the TDMD becomes the two-mode joint measurement device used in single-mode gate teleportation through a two-mode entangled resource state, where the mode in computation is teleported from temporal mode k in A, (A, k), to (A, k+nm). In this process, depending on the HD basis settings, $\theta_{A,k}$ and $\theta_{B,k}$, gate of operation $$\hat{R}(\theta_+)\hat{S}(\tan\theta_-)\hat{R}(\theta_+) \qquad \text{Eq. (2)}$$

is implemented on the teleported state, where $\theta_\pm=(\pm\theta_{A,k}+\theta_{B,k})/2$. Here $$\hat{R}(\theta) = e^{-i\theta(\hat{q}^2+\hat{p}^2)/2} \text{ and } \hat{S}(s) = e^{i\ln(s)(\hat{q}\hat{p}+\hat{p}\hat{q})/2}$$

are the rotation and squeezing operators. Note, k is defined in the logic level, while at the HDs, modes in A are delayed by n temporal modes relative to modes in B. All single-mode Gaussian gates can be implemented with two iterations of Eq. (2).

Enabling one of the two VBSs, two-mode gates can be implemented between nearest neighbors in the 3D time lattice. Two-mode gates between (A, k) and (A, k+1) is implemented by enabling the first VBS, while enabling the second VBS allows two-mode gates between (A, k) and (A, k+n). In the 3D time lattice of FIG. 1(c), the VBSs are represented by dotted arrows. To encode the surface code described in section 4 we implement two different symmetric two-mode gates:

$$\hat{C}_Z(g) = e^{ig\hat{q}\otimes\hat{p}} \text{ and } \hat{C}_X(g) = e^{ig\hat{p}\otimes\hat{p}}.$$

$\hat{C}_Z(g)$, being the controlled-phase gate, displaces one mode in $\hat{p}$ by $g\hat{q}$ of the other mode, while $\hat{C}_X(g)$ displace one mode in $\hat{q}$ by $g\hat{p}$ of the other mode—note, $\hat{C}_X(g)$ here does not correspond to a controlled-not gate. $\hat{C}_Z(g)$, or $\hat{C}_X(g)$, constitutes together with Eq. (2) a universal Gaussian gate set. In practice $\hat{C}_Z(g)$ and $\hat{C}_X(g)$ cannot be implemented in a single computation step without some Fourier by-product of $\pi/2$ phase-rotations, $\hat{F} = \hat{R}(\pi/2)$, on each mode. In total, for implementing the surface code in section 4, we make use of 4 variations of $\hat{C}_Z(g)$ and $\hat{C}_X(g)$, each listed in table 1 with their required basis settings for implementation. These are with $\hat{F} \otimes \hat{F}^\dagger$ or $\hat{F}^\dagger \otimes \hat{F}$ by-products before or after the two-mode gates, allowing the gates to be implemented in a single computation step with gate input from modes (A, k)$\otimes$(A, k+j) and output to modes (A, k+nm)$\otimes$(A, k+nm+j) where j=1 or j=n depending on which VBS is enabled.

TABLE 1

Two-mode gates with input and output in modes (A, k) $\otimes$ (A, k + j) and (A, k + nm) $\otimes$ (A, k + nm + j), respectively, and their required basis settings. Here, j = 1 when enabling the first VBS (marked by blue in FIG. 1), and j = n when enabling the second VBS (marked by green in FIG. 1). The order of the tensor products are arranged with earlier temporal modes first.

| Two-mode gate | Basis setting, $(\theta_{A,k}, \theta_{B,k}, \theta_{A,k+j}, \theta_{B,k+j})$ |
|---|---|
| $(\hat{F}^\dagger \otimes \hat{F})\,\hat{C}_Z(g)$ | $(-\arctan 2/g, 0, 0, \arctan 2/g)$ |
| $\hat{C}_Z(g)(\hat{F} \otimes \hat{F}^\dagger)$ | $(-\pi/2 + \arctan 2/g\ ,\ \pi/2,\ -\pi/2,\ \pi/2 - \arctan 2/g)$ |
| $(\hat{F} \otimes \hat{F}^\dagger)\hat{C}_X(g)$ | $(-\pi/2 + \arctan 2/g,\ \pi/2,\ -\pi/2,\ \pi/2 - \arctan 2/g)$ |
| $\hat{C}_X(g)(\hat{F}^\dagger \otimes \hat{F})$ | $(-\arctan 2/g, 0, 0, \arctan 2/g)$ |

Note, as apparent from the basis settings, $(\hat{F}^\dagger \otimes \hat{F})\hat{C}_Z(g) = \hat{C}_X(g)(\hat{F}^\dagger \otimes \hat{F})$ and $\hat{C}_Z(g)(\hat{F} \otimes \hat{F}^\dagger) = (\hat{F} \otimes \hat{F}^\dagger)\hat{C}_X(g)$. However, when implementing the gates in the surface code in section 4, it is useful to consider them individually, as we will have the Fourier by-products to cancel.

Finally, with finite squeezed in $|0\rangle_{Sq.}$ for the resource preparation, for each implemented gate, noise from the ancillary $|0\rangle_{Sq}$-states accumulates on the modes in computation. With $|0\rangle_{Sq.}$ having Gaussian quadrature distribution this gate noise leads to a Gaussian convolution of each quadrature for the modes in computation. With $|0\rangle_{Sq.}$ squeezed to have a variance of $\sigma^2 = e^{-2r}/2$ in the squeezed quadrature, following each implemented gate uncorrelated gate noise of $$\sigma_{gate}^2 = 2\sigma^2 = e^{-2r}$$

Eq. (3)

will be added symmetrically in each quadrature of the modes in computation. Here, r is the squeezing parameter of $|0\rangle_{Sq.}$, and ½ is the quadrature variance of vacuum. Besides gate noise, an implemented gate also course displacement of the modes in computation depending on the projective measurement outcomes. Since the measurement outcomes are known, this displacement can be compensated for by an opposite displacement of the gate output modes. However, it is not necessary to do so: Displacements are ubiquitous in MBQC, and they can simply be taken into account in the following measurement outcomes. Therefore, in this work, we will ignore displacements, while for practical implementation, one has to keep these in mind when analyzing the measurement outcomes.

GKP Quadrature Correction

If no care is taken, gate noise after each implemented gate accumulates on the modes in computation, and, depending on the amount of squeezing in the resource preparation, all encoded information will be blurred away after few gates. To overcome this, redundancy is introduced by qubit encoding in the infinite-dimensional Hilbert space of the bosonic modes, which can then be used to correct for the continuous variable gate noise at the cost of qubit errors. The qubit errors can then be handled by a qubit error correction scheme, which is the topic of section 4. Several encoding schemes of qubits into harmonic oscillators exist including cat-codes, binomial codes, and the Gottesman-Kitaev-Preskill (GKP) code. In this work, since gate noise is added as noise in the quadratures, we consider GKP-encoding where a qubit is encoded in the mode quadratures as Dirac combs. Furthermore, with the gate noise in Eq. (3) being added symmetrically in the quadratures, we consider GKP-qubits encoded on square grids in phase-space with a $2\sqrt{\pi} \times 2\sqrt{\pi}$ unit cell. For such encoded qubits, a universal Clifford gate set is realized by the all Gaussian gate set { $\hat{R}(\pi/2)$, $\hat{P}(1)$, $\hat{C}_Z(1)$} together with $\sqrt{\pi}$ displacements in phase-space.

Input information is encoded as GKP-qubit states in $|\psi\rangle_{GKP}$ before switched into the computation scheme's logic level in FIG. 1(a). With finite energy constriction of the GKP-states, the delta functions of the Dirac comb in the GKP-state quadrature wave function is replaced with finite squeezed Gaussian functions, each with a variance of $$\sigma_{GKP}^2$$

and an overall envelope that satisfies the Fourier relations between the orthogonal $\hat{q}$ and $\hat{p}$ quadratures with equally squeezed spikes. Here, with sufficient high squeezing, we ignore the overall envelope, while we assume the Gaussian GKP-spikes squeezed equally to the $|0\rangle_{Sq.}$-states in the resource preparation, $$\sigma_{GKP}^2 = \sigma^2 = e^{-2r}/2.$$

Eq. (4)

With Gaussian gate noise, after each gate the GKP-spike variance in each quadrature increase by $$\sigma_{gate}^2$$

of Eq. (3). To prevent this, GKP quadrature correction is performed, preferably after each implemented gate. Traditionally, this is done by coupling each quadrature to ancillary GKP-states, which are then measured, and the result is fed forward to displacements of the GKP-state encoding the information in computation (or compensated for in following measurement outcomes). This approach, however, requires active two-mode gates which are experimentally hard to implement online, while noisy to implement by projective measurements. Instead, here we take the new approach in where GKP correction is realized by qubit teleportation using ancillary GKP-qunaught states and is directly compatible with our computation scheme. The GKP-qunaught state, $|\varnothing\rangle_{GKP}$, is the 1-level version of the generalized GKP-qubit state with a $\sqrt{2\pi}$ spacing between the spikes in the quadrature wave functions. As such, $|\varnothing\rangle_{GKP}$ holds no information, however, after interfering two $|\varnothing\rangle_{GKP}$-states on a beam-splitter, a two-mode GKP-qubit Bell-state is prepared. This state can then be used for teleportation of a GKP-qubit, but with support only on the GKP grid in which a noisy GKP-qubit is projected into a fresh GKP-qubit by the teleportation.

An implementation of the GKP correction is shown in FIG. 3. In the resource preparation, we switch from $|\rangle_{sq.}$ to $|\emptyset\rangle_{GKP}$ states, and after interference, on the first beamsplitter, a GKP-qubit Bell-state is prepared in the logic level instead of a two-mode CV cluster state. For teleportation of a noisy GKP-qubit through the GKP-qubit Bell-state, a Bell-measurement of the noisy GKP-qubit and one mode of the Bell-state is carried out by the TDMD when leaving the two VBSs open and measuring in $\hat{q}$ and $\hat{p}$ basis in the HDs of spatial mode A and B, respectively. The corresponding graph in a small section of the 3D time lattice is shown in FIG. 3 as well together with the corresponding circuit. The resulting Kraus operator, $$\hat{K}_{(m_A, m_B)} = N\, \hat{\tilde{\Pi}}_{GKP}\, \hat{X}_{(-m_A\sqrt{2})}\, \hat{Z}_{(-m_B\sqrt{2})}, \qquad \text{Eq. (5)}$$

projects the noisy input state into a fresh GKP qubit state. Here, $$\hat{X}(-m_A\sqrt{2}) = e^{im_A\sqrt{2}\,\hat{p}} \text{ and } \hat{Z}(-m_B\sqrt{2}) = e^{-im_B\sqrt{2}\,\hat{q}}$$

are displacements in $\hat{q}$ and $\hat{p}$ quadratures, respectively, depending on the measurement outcomes $m_A$ and $m_B$, N is a normalization factor, also depending on the measurement outcomes, and $$\hat{\tilde{\Pi}}_{GKP} = |\tilde{0}_{GKP}\rangle\,\langle\tilde{0}_{GKP}| + |\tilde{1}_{GKP}\rangle\,\langle\tilde{1}_{GKP}|$$

is a noisy GKP-projector where $|\tilde{j}_{GKP}\rangle$ are approximate GKP Pauli-Z eigenstates with spike variance squeezed equally to the squeezing in the initial $|\emptyset\rangle_{GKP}$-states. Similar to the available GKP-qubit input states, $|\psi\rangle_{GKP}$, we assume the spikes in the $|\emptyset\rangle_{GKP}$-states to be squeezed by $$\sigma^2_{GKP}$$

of Eq. (4), leading to $$\sigma^2_{GKP}$$

spike variance of the newly projected GKP-state.

With GKP-states as input, $m_A$ and $m_B$ take integer values of $\sqrt{\pi}$ plus some noise from the finite squeezing of the GKP qubit and qunaught states. As such, the $\hat{X}(-m_A\sqrt{2})$ and $\hat{Z}(-m_B\sqrt{2})$ displacements in Eq. (5) mainly corresponds to Pauli-X and Pauli-Z operations on the encoded qubit, and is a natural result of the teleportation similar to regular qubit teleportation. These displacements may be compensated for by displacing the teleported state back in $\hat{q}$ ($\hat{p}$) by $m_{A(B)}\sqrt{2}$ rounded to the nearest integer of $\sqrt{\pi}$, or simply taken into account in the following measurement outcomes. However, due to the noise in $m_A$ and $m_B$ from finite squeezing of the GKP states, occasionally $m_{A(B)}\sqrt{2}$ will be rounded to a wrong integer of $\sqrt{\pi}$ inducing a qubit error when compensating with a wrong Pauli operation by displacement. From the residual analogue information left out when rounding $m_{A(B)}\sqrt{2}$, $$R(m_{A(B)}\sqrt{2}) = m_{A(B)}\sqrt{2} - \sqrt{\pi}\left\lfloor \frac{m_{A(B)}\sqrt{2}}{\sqrt{\pi}} + \frac{1}{2} \right\rfloor,$$

we can infer the likelihood of inducing a Pauli-X or -Z error from $m_A$ and $m_B$, respectively, with probability $$p_\sigma(z) = \frac{\sum_{n\in Z}\exp[-(z-\{2n+1\}\sqrt{\pi})^2/(2\sigma^2)]}{\sum_{n\in Z}\exp[-(z-n\sqrt{\pi})^2/(2\sigma^2)]} \qquad \text{Eq. (6)}$$

where $z=R(m_{A(B)}\sqrt{2})$. Here $$\sigma^2 = \sigma^2 + \sigma^2_{GKP}$$

is the variance of $m_A$ and $m_B$ with $\sigma^2$ being the spike variance of the GKP-qubit before teleportation. For example, if the GKP-qubit to be corrected has gone through one gate, then $$\sigma^2 = \sigma^2_{GKP} + \sigma^2_{gate}$$

where $$\sigma^2_{GKP}$$

was the GKP-qubit spike variance before the gate and $$\sigma^2_{gate}$$

is the gate noise variance in Eq. (3). Using the analogue information from the GKP quadrature correction can be used to improve the concatenated qubit error correction. We use this information through the probability in Eq. (6) to improve the surface code in section 4.

3. Surface Code

Having projected the continuous variable noise from finite squeezing in section 2 into qubit errors by GKP quadrature correction in section 3, for fault-tolerant computation we need to correct these qubit errors with quantum error correction. With the nearest neighbor interactions of the computation scheme in section 2, topological error correction is advantages. Here, with information encoded on a surface of the computation scheme's 3D time lattice, and gates implemented in the third dimension, we consider the surface code. Specifically, to validate fault-tolerance, we adopt a simulation of the rotated surface code, and modify it to the computation scheme here. Below, in section 4.A, we first describe the implementation of the surface code, and then consider it combined with GKP correction. In section 4.B we then present simulation results of logical error rates and a squeezing threshold.

4.A The Code

One logic qubit of the rotated surface code is shown in FIG. 4(a) for a code distance d=5. Information is encoded in $d^2$ data qubits (white and gray circles) while stabilized with $(d^2-1)/2$ measure-Z and measure-X qubits (green and red circles, respectively) detecting X and Z qubit errors. One round of syndrome measurements measuring the surface code stabilizers is shown in FIG. 4(b,c), consisting of four gates and thereby four steps along the third dimension of the 3D time lattice in which the surface code is implemented as shown in FIG. 4(d). The measure-Z and -X qubits are initialized by switching GKP-qubits in the $0\rangle_{GKP}$ and $0\rangle_{GKP} \propto \sqrt{|0\rangle_{GKP}+1\rangle_{GKP}}$ qubit states into the logic level. The measure-Z and -X qubits are then coupled to neighboring data qubits using $$\hat{C}_Z(1) = e^{i\hat{q}\otimes\hat{q}} \text{ and } \hat{C}_X(\pm 1) = e^{\mp i\hat{p}\otimes\hat{p}}$$

gates, before measured in $\hat{p}$ and $\hat{q}$ basis, respectively. To measure the measure qubits using the TDMD, the VBSs are left open while the same basis is chosen in spatial mode A and B in which case the measurements commutes with beam-splitter of the TDMD. Note, the measure qubit state initialization and measurement basis are opposite of what is traditionally used in the surface code since they are coupled to data qubits via $\hat{C}_Z$ and $\hat{C}_X$ gates instead of sum-gates, $$\hat{C}_{NOT} = e^{-i\hat{q}\otimes\hat{p}}.$$

The reason for not using sum-gates is that sum-gates cannot be implemented in the MBQC scheme here in a single set of projective measurements, and sum-gates will therefore lead to larger gate noise.

While measure-Z qubits are coupled to data qubits with a constant coupling rate through $\hat{C}_Z(1)$, measure-X qubits are coupled to data qubits with $\hat{C}_X(1)$ in step 1 and 4 and $\hat{C}_X(-1)$ in step 2 and 3. This is to prevent the propagation of finite squeezing noise among measure-qubits (though this does not matter in the case of GKP correction during the stabilizer measurements as discussed later). Furthermore, since the $\hat{C}_Z(1)$ and $\hat{C}_X(\pm 1)$ gates cannot be implemented in a single computation step without Fourier by-products as described in section 2, the surface code is implemented with the two-mode gates listed in table 1, and so, for the different two-mode gates in FIG. 4 we use $$\hat{t} = \begin{cases} (\hat{F}^\dagger \otimes \hat{F})\hat{C}_Z(1), & \text{step 1 \& 3} \\ \hat{C}_Z(1)(\hat{F} \otimes \hat{F}^\dagger), & \text{step 2 \& 4} \end{cases}, \qquad \text{Eq. (7)}$$

$$\hat{t} = \begin{cases} (\hat{F} \otimes \hat{F}^\dagger)\hat{C}_X(1), & \text{step 1} \\ \hat{C}_X(1)(\hat{F}^\dagger \otimes \hat{F}), & \text{step 4} \end{cases},$$

$$\hat{t} = \begin{cases} (\hat{F} \otimes \hat{F}^\dagger)\hat{C}_X(-1), & \text{step 3} \\ \hat{C}_X(-1)(\hat{F}^\dagger \otimes \hat{F}), & \text{step 2} \end{cases},$$

where the first term in the tensor products is the earlier temporal mode in the logic level. In this way, the Fourier by-products of step 1(3) and 2(4) cancel as $\hat{F} \hat{F}^\dagger = \hat{F}^\dagger \hat{F} = \hat{I}$ measure-Z and odd data qubits, and becomes $\hat{F} \hat{F} = \hat{F}^\dagger$ $\hat{F}^\dagger = \hat{F}$ on measure-X and even data qubits, which has no influence on the encoded information or propagation of errors or CV noise (for CV noise $-\hat{t}$ on even data qubits cancels with $-\hat{t}$ on measure-X qubits when phase-space displacements propagate in-between measure qubits).

Having implemented the surface code using the computation scheme in section 2 with GKP-encoded data and measure qubits, to prevent the accumulation of CV gate noise, we proceed to combine the surface code with GKP quadrature correction described in section 3. Commonly, for the so-called surface-GKP code, in each round of syndrome measurements, the GKP data qubits are corrected first followed by surface code stabilizer measurements. In this way, qubit errors induced in the GKP correction is corrected by the surface code. However, the surface-GKP code allows accumulation of gate noise during the 4 gates of the stabilizer measurements in FIG. 4(b,c). Instead, we propose to perform GKP correction of each mode after every implemented gate. I.e., for the Z- and X-stabilizer measurements, GKP correction is performed 4 times, and we refer to this as the surface-4-GKP code. Unfortunately, when doing so, class-2 qubit errors are induced during the surface code stabilizer measurements with a large impact on the fault-tolerant error threshold. Two examples of induced qubits errors, and how they propagate during the stabilizer measurements, are shown in FIG. 4(e,f). Here, a qubit $\hat{X}$ error on a measure-Z qubit, induced in the GKP correction after the first gate of the stabilizer measurement, propagates to 3 data qubits as $\hat{Z}$ errors through the $\hat{C}_Z$ gates (while an initial $\hat{Z}$ error will not propagate through $\hat{C}_Z$), from where it further propagates to two measure-X qubits through $\hat{C}_X$ gates. Similarly, a $\hat{Z}$ error on a data qubit after the first two-mode gate propagates as $\hat{X}$ error to measure-X qubits through $\hat{C}_X$. These errors lead to faulty syndrome measurements, and may therefore lead to wrong error recovery inducing logic errors, but even then, we will find a significant improvement of the surface-4-GKP code over the surface-GKP code. Note, in the case here with GKP correction after every gate, having $-1$ coupling rate in $\hat{C}_X(-1)$ of step 2 and 3 is unnecessary, as all CV noise is immediately corrected. However, since a $-1$ coupling rate requires no extra resources and is solely controlled by the basis settings in table 1, we keep it like this to compare with the surface-GKP code.

Finally, the surface code Z- and X-stabilizers measurement outcomes from d rounds of syndrome measurements are recorded in 3D Z- and X-spacetime graphs (here 'space' traditionally refers to the plane of qubits in the surface code, though in implementation here this 'space'-plane is encoded in time on a surface of the 3D time lattice) on which minimum-weight perfect matching (MWPM) is used as decoding algorithm to determine data qubit errors and the resulting error recovery—in practice, the error recovery is simply handled by using and updating a Pauli frame, similar to how feedforward can be handled in MBQC by compensating for by-products in following measurement outcomes. Using the residual analogue information from the GKP correction to infer the probability of inducing a qubit error by Eq. (6), the edges of the spacetime graphs are weighted for the MWPM algorithm to find error paths of highest probability. With 4 GKP corrections of each mode in one round of syndrome measurements, multiple error probabilities are combined in each edge weight as $$p_{tot.} = \frac{1}{2}\left(1 - \prod_i [1 - 2p_i]\right),$$

where $p_i$ is the probability of Eq. (6) for one GKP correction taking values between 0 (no error) and ½ (minimum error information). With propagating qubit errors, it is not straightforward how to combine error probabilities of different GKP-qubits, and here we have done as follows: Errors on a measure qubit, both induced by GKP correction and propagated from other modes, are combined on the corresponding vertical edge representing a measurement error. Errors on a data qubit, both induced by GKP correction and propagated from other modes, are combined on the corresponding horizontal edge of the following round of syndrome measurements where the data qubit errors will be detected, except for $\hat{Z}$ ($\hat{X}$) errors on odd(even) data qubits induced in the first step, which are instead included in horizontal edges of the current round of syndrome measurements as they will be correctly detected here. For the probabilities to correctly add up in the MWPM, $\log_2(p_{tot.})$ edge weights are used in the spacetime graphs.

4.B Simulation Results

To simulate a fault-tolerant error threshold, GKP-encoded data and measure qubits, and the qunaught states for GKP correction, $\emptyset d_{GKP}$, are initialized with $$\sigma^2_{GKP} = \sigma^2 = e^{-2r}/2$$

variance of the wave functions' GKP spikes as described in section 3. The ancillary squeezed vacuum states for gate implementation, $0\rangle_{Sq.}$, are equally squeezed by $\sigma^2 = e^{-2r}/2$ leading to quadrature symmetric gate noise of variance $$\sigma^2_{gate} = 2\sigma^2 = e^{-2r}$$

as described in section 2. Using the Monte Carlo method logical qubit error rates are simulated as a function of squeezing using 100,000 simulation samples or until 500 combined logic $\hat{Z}$ and $\hat{X}$ qubit errors events. The resulting logical $\hat{Z}$ or $\hat{X}$ error rate (they are equal) is shown in FIG. 5(a) for different code distances d, while the logical $\hat{Y}$ error rate is smaller. Here, the decibel scale is defined relative to vacuum variance, $10 \log_{10}[\sigma^2/(½)]$. The resulting squeezing threshold from where the logic error rate decrease with increasing code distance is found to be 13.2 dB of squeezing.

For comparison, in FIG. 6 simulated error rates of other scenarios are shown. For the surface-GKP code, with GKP correction before surface code stabilizer measurements, the squeezing threshold increases to 17.3 dB. This is significantly higher than the 13.2 dB squeezing threshold of the surface-4-GKP code due to accumulation of gate noise during the stabilizer measurements. To compare with other MBQC schemes with topological error correction where gate noise is typically not taken into account, and so only includes finite squeezing noise from GKP-states, we simulate the surface-4-GKP code with $$\sigma^2_{gate} = 0.$$

The resulting threshold is 10.6 dB of squeezing which agrees with literature. Finally, to see the impact of using the residual analogue information of the GKP correction in the weighting of the spacetime graphs for MWPM decoding, we simulate the surface-4-GKP code with fixed weighting based on variances of each mode at each point in the code. As expected, the result is a slightly larger squeezing threshold of 14.1 dB.

It has been proposed to combine multiple GKP-state generators with optical switches, and then switch between generators with a successful preparation of a GKP-state. In this way, the success probability of the GKP-state generation, $p_{suc.}$, can in principle be brought arbitrarily close to 1. Since the surface-4-GKP code is resource-intensive on $\emptyset\rangle_{GKP}$-states, finally, we consider a multi-GKP-state generation scheme for preparing $\emptyset\rangle_{GKP}$-states in the resource preparation. If all the generators fail to prepare a $\emptyset\rangle_{GKP}$-state in a temporal mode for GKP correction, a deterministically generated squeezed vacuum state, $0\rangle_{Sq.}$, is used in replacement. In this case, if $\emptyset\rangle_{GKP}$ is replaced by $0\rangle_{Sq.}$ in spatial mode A(B), only the $\hat{q}$ ($\hat{p}$) quadrature is corrected in the GKP correction, while the other quadratures accumulates gates noise of variance $$\sigma^2_{gate}$$

during the correction. The resulting fault-tolerance squeezing threshold is shown in FIG. 5(b) as function of the probability $1-p_{suc.}$ of replacing $\emptyset\rangle_{GKP}$-states by $0\rangle_{Sq.}$-states. Here, for each point, the threshold is estimated as the crossing point of the logic error rates for code distances d=7 and d=9. For zero replacement probability, $1-p_{suc.}=0$, where $\emptyset\rangle_{GKP}$-states are always successfully generated for each temporal mode, the squeezing threshold is the same as in FIG. 5(a). For increasing replacement probability, the squeezing threshold level increases as expected, while it seems to converge to infinite squeezing around $1-p_{suc.}\approx0.95$. Note, here we still assume successful encoding of the surface code. I.e., the data and measure qubits switched into the setup $\psi\rangle_{GKP}$ in FIG. 1(a) is successfully prepared as GKP-qubit states. With probabilistic optical GKP-state generation, this may be possible using state storage of a probabilistically prepared GKP-state until it is switched into the computation scheme.

FIG. 7 shows how an arbitrary number of temporal computation devices 701-704 can be combined to increase the capacity. For each temporal computation device 701-704 there is a 2×2 switch 711-714 that connects an output of a first time delay unit 721-724 to an optical router input (O1,O2,O3,O4) of an optical router 726. The optical router connects the optical router inputs to optical router output (I1,I2,I3,I4), so that one optical router input is transferred to each optical router output so that no signals are mixed. The optical router can be static so that the setting of the optical router is not changed or it can be dynamic so that the setting of the optical router is changed during a computation. The 2×2 switches 711-714 can also be static (constantly crossed or non-crossed, in which case the switches are not necessarily switches but just cross or non-crossed connectors) or dynamic. The optical router can also distribute an input state $\psi_{in}\rangle$ to some chosen optical router outputs (I1,I2,I3,I4). Which optical router outputs that receives the input state $\psi_{in}\rangle$ can be static or dynamic so that which optical router outputs, which receives the input state $\psi_{in}\rangle$, varies in times.

Whether the distribution of the input state $|\psi_{in}\rangle$ is static or dynamic is independent on whether the transfer of the optical router input to the optical router output is static or dynamic.

The present invention is not limited to the presented embodiments but contemplates any temporally encoded version or partly spatially encoded version and any path-couplers or variable path-couplers that can interfere two optical modes.

The invention claimed is:

1. A measurement based photonic quantum computing system comprising:
   an optical input generator comprising:
      a paired input source configured to receive optical paired inputs, and
      a first time delay unit,
   wherein the optical input generator is configured for:
      receiving first optical paired inputs, and second optical paired inputs, wherein the first optical paired inputs are first optical entangled paired inputs and the second optical paired inputs are second optical entangled paired inputs, or
      receiving first optical paired inputs and second optical paired inputs, and generating first optical entangled paired inputs and second optical entangled paired inputs from the first optical paired inputs, and second optical paired inputs, respectively; and
      inducing a first predefined relative time delay using the first time delay unit into each optical entangled paired inputs for making one mode of the first and one mode of the second entangled optical paired inputs into coexisting optical inputs, representing a logic level of the quantum computing system; and
   a delocalized measurement architecture comprising:
      a second time delay unit,
      a third time delay unit,
      two optical detectors,
      a beam splitter,
      a first and second variable path-couplers,
   wherein the delocalized measurement architecture is configured for gate implementation of the quantum computing system by:
      optically interfering coexisting optical inputs for generating intermediate outputs;
      optically interfering by the first and the second variable path-couplers for each intermediate outputs a first mode of the intermediate outputs to a second mode of first or second neighboring intermediate outputs, respectively, for generating interfered outputs; and
      detecting by the two optical detectors each mode of the intermediate outputs and the interfered outputs.

2. The measurement based photonic quantum computing system according to claim 1, wherein the two optical detectors are two homodyne optical detectors.

3. The measurement based photonic quantum computing system according to claim 1, wherein the delocalized measurement architecture is further configured for inducing a second predefined relative time delay into each intermediate outputs.

4. The measurement based photonic quantum computing system according to claim 3, wherein the delocalized measurement architecture is further configured for inducing a third predefined relative time delay into each interfered outputs.

5. The measurement based photonic quantum computing system according to claim 4, wherein:

the first predefined relative time delay is n times m time units, wherein n is a positive integer and >0, m is a positive integer; and
   wherein the second predefined relative time delay is 1 time unit and the third predefined relative time delay is n−1 time units.

6. The measurement based photonic quantum computing system according to claim 5, wherein the first and the second optical paired inputs are received n times m time units apart.

7. The measurement based photonic quantum computing system according to claim 1, wherein the delocalized measurement architecture is configured for time-delaying the first mode of the intermediate outputs by:
   the second predefined relative time delay; or
   the second and the third predefined relative time delays;
   relative to the second mode of the first or the second neighboring intermediate outputs, respectively, for causing the first mode of the intermediate outputs to be coexisting with the second mode of the first or the second neighboring intermediate outputs at the first or the second variable path-coupler, respectively.

8. The measurement based photonic quantum computing system according to claim 1, wherein the measurement based photonic quantum computing system comprises n times m sets of the optical input generator and the delocalized measurement architecture, wherein n is a positive integer and >0, m is a positive integer.

9. The measurement based photonic quantum computing system according to claim 8, wherein the second mode of the first or the second neighboring intermediate outputs is an intermediate output of a first or a second set of the optical input generator and the delocalized measurement architecture different from the set of the optical input generator and the delocalized measurement architecture of the first mode of the intermediate outputs.

10. The measurement based photonic quantum computing system according to claim 9, wherein the first predefined relative time delay is one time unit, and the first and the second optical paired inputs are received one time unit apart.

11. The measurement based photonic quantum computing system according to claim 1, wherein the optical input generator comprises a two-mode squeezing generator configured for generating the optical paired inputs.

12. The measurement based photonic quantum computing system according to claim 11, wherein the two-mode squeezing generator is:
   a first two-mode gate;
   a first balanced path-coupler;
   a controlled-Z gate;
   a parametric down-convertor; or
   a four-wave mixer.

13. The measurement based photonic quantum computing system according to claim 1, wherein the optical input generator comprises a two-mode squeezing generator configured for generating an entangled two-mode squeezed state.

14. The measurement based photonic quantum computing system according to claim 1, wherein the optical input generator comprises a two-mode entangled Gottesman-Kitaev-Preskill (GKP) qubits generator, configured for interfering or coupling optical inputs for generating the received optical paired inputs.

15. The measurement based photonic quantum computing system according to claim 14, wherein the two-mode entangled GKP qubits generator is:
   a first two-mode gate, a first balanced path-coupler or a controlled gate, for coupling two GKP states; or configured for direct generation of two entangled GKP states.

16. The measurement based photonic quantum computing system according to claim 1, wherein the optical input generator comprises a two-mode entangled Gottesman-Kitaev-Preskill (GKP) qubits generator, configured for interfering or coupling optical inputs for generating the received optical paired inputs, as two entangled GKP qubits.

17. The measurement based photonic quantum computing system according to claim 1, wherein the optical input generator comprises two first switches configured for switching continuously between:

a first position configured for transferring squeezed vacuum states, $|0\rangle_{Sq}$, as optical inputs; and a second position configured for transferring Gottesman-Kitaev-Preskill (GKP) states of encoded 1-level systems, $\varnothing\rangle_{GKP}$, as optical inputs;

to the first balanced path-coupler, or the optical input generator comprises two second switches configured for switching continuously between;

a first position configured for transferring an entangled two-mode squeezed vacuum states as optical paired inputs; and a second position configured for transferring an entangled GKP state as optical paired inputs.

18. The measurement based photonic quantum computing system according to claim 1, wherein the optical input generator comprises:

a first time-delay unit configured for performing the first predefined relative time delay, wherein the first time-delay unit comprises an input and an output; and a second switch positioned at the input or the output of the first time-delay unit, wherein the second switch in a closed position is configured for transferring a state of encoded information to the input or the output of the first time-delay unit.

19. The measurement based photonic quantum computing system according to claim 18, wherein the state of encoded information is a Gottesman-Kitaev-Preskill (GKP)-qubit state, $|\psi\rangle_{GKP}$.

20. A second measurement based photonic quantum computing system comprising a number, from one to N, of the measurement based photonic quantum computing systems according to claim 1, wherein each of the number of measurement based photonic quantum computing systems is configured for transferring:

one mode of the first optical paired inputs of each of the N measurement based photonic quantum computing systems to be coexisting with another mode of the first optical paired inputs of the next measurement based photonic quantum computing system; or one mode of the coexisting optical inputs of each measurement based photonic quantum computing system to be coexisting with another mode of coexisting optical inputs of the next measurement based photonic quantum computing system;

wherein the next measurement based photonic quantum computing system for the Nth measurement based photonic quantum computing system is the first measurement based photonic quantum computing system.

21. A temporal delocalized measurement device, comprising:

a balanced path-coupler configured for interfering received coexisting optical inputs and for interfering received first or second neighboring coexisting optical inputs for generating intermediate outputs, and for generating first or second neighboring intermediate outputs, respectively;

a second time delay unit;

a third time delay unit;

first and second variable path-couplers positioned after the second time delay unit and the third time delay unit, respectively; and two optical detectors;

wherein the second time delay unit and the third time delay unit are configured for inducing a second predefined relative time delay and a further third predefined relative time delay, respectively, into each of the intermediate outputs and into the first or second neighboring intermediate outputs for causing a first mode of the intermediate outputs to be coexisting with a second mode of the second or the third neighboring intermediate outputs at the first or at the second variable path-coupler, respectively;

wherein the first and the second variable path-couplers are configured for optically interfering the first mode of the intermediate outputs and the second mode of the second or the third neighboring intermediate outputs, respectively, for generating interfered outputs; and wherein the two optical detectors are configured for detecting each mode of the intermediate outputs and the interfered outputs.

22. The temporal delocalized measurement device according to claim 21, wherein the two optical detectors are two homodyne optical detectors.

23. A n times m spatial delocalized measurement device, wherein n is a positive integer and >0, m is a positive integer, the device comprising:

a balanced path-coupler configured for interfering received first and second coexisting optical inputs and for generating first and second intermediate outputs;

first and second variable path-couplers for the first intermediate output;

first and second variable path-couplers for the second intermediate output; and first and second optical detectors;

wherein the first and the second variable path-couplers for the first intermediate output of an $i^{th}, j^{th}$ spatial delocalized measurement device of the spatial delocalized measurement devices are configured for interfering the first intermediate output and a second intermediate output of an $i+1^{th}, j^{th}$ spatial delocalized measurement device or for interfering the first interfered coexisting optical input and a second intermediate output of an $i^{th}, j+1^{th}$ spatial delocalized measurement device, respectively, for generating a first interfered output;

wherein the first and the second variable path-couplers for the second intermediate output of the ith,jth spatial delocalized measurement device are configured for interfering the second intermediate output and a first intermediate output of an $i-1^{th}, j^{th}$ spatial delocalized measurement device or for interfering the second intermediate output and a first intermediate output of an $i^{th}, j-1^{th}$ spatial delocalized measurement device, respectively, for generating a second interfered output; and wherein the first and second optical detectors are configured for simultaneously detecting the first intermediate output or the first interfered output, and the second intermediate output or the second interfered output, respectively.

* * * * *